US010198872B2

(12) United States Patent
Lurie et al.

(10) Patent No.: US 10,198,872 B2
(45) Date of Patent: Feb. 5, 2019

(54) 3D RECONSTRUCTION AND REGISTRATION OF ENDOSCOPIC DATA

(71) Applicant: The Board of Trustees of the Leland Stanford Junior University, Stanford, CA (US)

(72) Inventors: Kristen L. Lurie, Palo Alto, CA (US); Dimitar V. Zlatev, Palo Alto, CA (US); Joseph Chihping Liao, Stanford, CA (US); Audrey K. Bowden, Stanford, CA (US); Roland Angst, Taipei (TW)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 0 days.

(21) Appl. No.: 15/233,856

(22) Filed: Aug. 10, 2016

(65) Prior Publication Data

US 2017/0046833 A1 Feb. 16, 2017

Related U.S. Application Data

(60) Provisional application No. 62/203,280, filed on Aug. 10, 2015, provisional application No. 62/313,649, filed on Mar. 25, 2016.

(51) Int. Cl.
*G06T 19/20* (2011.01)
*G06T 17/20* (2006.01)
(Continued)

(52) U.S. Cl.
CPC .............. *G06T 19/20* (2013.01); *G06T 5/008* (2013.01); *G06T 7/579* (2017.01); *G06T 17/20* (2013.01);
(Continued)

(58) Field of Classification Search
CPC .............................. G06T 17/20; G06T 17/205
(Continued)

(56) References Cited

U.S. PATENT DOCUMENTS 5,323,233 A * 6/1994 Yamagami ............. H04N 9/045
348/276
6,503,195 B1 * 1/2003 Keller ................ A61B 1/00163
348/45
(Continued)

FOREIGN PATENT DOCUMENTS

WO 2017027638 2/2017
WO 2017027638 A1 2/2017

OTHER PUBLICATIONS

Sánchez-González, P., Gayá, F., Cano, A.M., Gómez, E.J.: Segmentation and 3D reconstruction approaches for the design of laparoscopic augmented reality environments. In: Bello, F., Edwards, E. (eds.) ISBMS 2008. LNCS, vol. 5104, pp. 127-134. Springer, Heidelberg (2008).*

(Continued)

*Primary Examiner* — Jin Ge
(74) *Attorney, Agent, or Firm* — KPPB LLP

(57) ABSTRACT

Methods and systems for three-dimensional (3D) reconstruction of endoscopic data in accordance with embodiments of the invention are described. In one embodiment, a method for processing a plurality of images captured by an endoscope includes preprocessing a plurality of images captured by an endoscope and including at least a portion of an organ. In many embodiments of the invention, the preprocessing includes estimating variations in light intensity within scenes captured by the plurality of images, and generating a set of color-adjusted images based on those variations. The method according to some embodiments of the invention may include generating a 3D point cloud representing points on a surface of the organ based on the set
(Continued)

of color-adjusted images, defining a mesh representing the surface of the organ based on the 3D point cloud, and generating a texture of the surface of the organ based on the set of color-adjusted images.

11 Claims, 17 Drawing Sheets

(51) Int. Cl.
    *G06T 5/00*     (2006.01)
    *G06T 7/579*     (2017.01)

(52) U.S. Cl.
    CPC    *G06T 2200/08* (2013.01); *G06T 2207/10024* (2013.01); *G06T 2207/10068* (2013.01); *G06T 2207/10101* (2013.01); *G06T 2210/41* (2013.01); *G06T 2210/56* (2013.01); *G06T 2219/2012* (2013.01)

(58) Field of Classification Search
    USPC .......................................................... 345/423
    See application file for complete search history.

(56) References Cited

U.S. PATENT DOCUMENTS

| | | | | |
|---|---|---|---|---|
| 6,549,288 | B1* | 4/2003 | Migdal | G01B 11/25 356/601 |
| 2008/0123927 | A1* | 5/2008 | Miga | A61B 90/36 382/131 |
| 2010/0079503 | A1 | 4/2010 | Ramanath et al. | |
| 2011/0102550 | A1 | 5/2011 | Daniel et al. | |
| 2013/0063434 | A1* | 3/2013 | Miga | A61B 90/36 345/420 |
| 2016/0070878 | A1* | 3/2016 | Soper | G06F 19/3437 703/11 |
| 2016/0278678 | A1* | 9/2016 | Valdes | A61B 5/14556 |

OTHER PUBLICATIONS

H. N. Tokgozoglu, E. M. Meisner, M. Kazhdan, and G. D. Hager. Color-based hybrid reconstruction for endoscopy. In Workshops on Medical Computer Vision at CVPR, 2012.*
G. Ciuti, M. Visentini-Scarzanella, A. Dore, A. Menciassi, P. Dario, and G.-Z. Yang, "Intra-operative monocular 3D reconstruction for imageguided navigation in active locomotion capsule endoscopy," in Proc. 4th IEEE RAS EMBS Int. Conf. Biomed. Robot. Biomechatron., Jun. 2012, pp. 768-774.*
Agenant et al., "Real-Time Bladder Lesion Registration and Navigation: A Phantom Study", PLOS ONE, vol. 8, No. 1, Jan. 2013, e54348.
Atasoy et al., "Probabilistic Region Matching in Narrow-Band Endoscopy for Targeted Optical Biopsy", Med Image Comput Comput Asst Interv, 5761, 2009, pp. 449-506.
Behrens et al., "Local and Global Panoramic Imaging for Fluorescence Bladder Endoscopy", Engineering in Medicine and Biology Society, 2009. EMBC 2009. Annual International Conference of the IEEE, Conference Date: Sep. 3-6, 2009, Minneapolis, MN, USA.
Ben-Hamadou et al., "Flexible calibration of structured-light systems projecting point patterns", Post-print accepted for publication in Computer Vision and Image Understanding, Nov. 11, 2013.
Bouguet, "Camera Calibration Toolbox for Matlab", Retrieved from: http://www.vision.caltech.edu/bouguetj/calib_doc/, 2004, Last Updated: Oct. 14, 2015.
Boykov et al., "An Experimental Comparison of Min-Cut/Max-Flow Algorithms for Energy Minimization in Vision", IEEE Transactions on PAMI, vol. 26, No. 9, Sep. 2004.
Cignoni et al., "MeshLab: an Open-Source 3D Mesh Processing System", ERCIM News, 73, Apr. 2008, pp. 47-48.
Clark et al., "Clinical Practice Guidelines in Oncology", Journal of the National Comprehensive Cancer Network 11(4), 446-475 (2013).
Doignon et al., "Real-time segmentation of surgical instruments inside the abdominal cavity using a joint hue saturation color feature", Real-Time Imaging , 11, 2005, pp. 429-442, Available online Aug. 18, 2005.
Durrant-Whyte et al., "Simultaneous Localization and Mapping (SLAM): Part II", IEEE Robotics & Automation Magazine 13(3), 108-117 (2006).
Durrant-Whyte et al., "Simultaneous Localization and Mapping: Part I", IEEE Robotics & Automation Magazine 13(2), 99-110 (2006).
Feldmar et al., "Extension of the ICP Algorithm to non rigid Intensity-based Registration of 3D Volumes", Retrieved from: http://citeseerx.ist.psu.edu/viewdoc/download;jsessionid=DDE392406EFB49A288496308A363ED73?doi=10.1.1.32.8961&rep=rep1&type=pdf, Comput Vis Image Und 66, 1997, pp. 193-206.
Hartley et al., "Multiple View Geometry in computer vision", Cambridge University Press, New York, NY 2nd edition (2004).
Jacques, "Corrigendum: Optical properties of biological tissues: a review", Phys. Med. Biol. 58, 2013, pp. 5007-5008.
Lempitsky et al., "Seamless Mosaicing of Image-Based Texture Maps", Computer Vision and Pattern Recognition, 2007, Conference on Jul. 17-22, 2007, Minneapolis, MN, USA.
Lurie et al., "3D reconstruction of cystoscopy videos for comprehensive bladder records", BioMedical Optics Express 2106, vol. 8, No. 4, Apr. 1, 2017, Published Mar. 8, 2017.
Mehmood et al., "Video summarization based tele-endoscopy: a service to efficiently manage visual data generated during wireless capsule endoscopy procedure", J Med Syst 38:109, Jul. 19, 2014.
Penne et al., "Time-of-Flight 3-D Endoscopy", Med Image Comput Comput Assist Intery 12, 2009, pp. 467-474.
Sanchez et al., "Optical Coherence Tomography (OCT) as an Adjunct to Conventional Cystoscopy and Pathology for Non-Invasive Endoscopic Staging of Bladder Tumors", POD-05.06, Urology 78, Supplement 3A, Sep. 2011, S18.
Schmidbauer et al., "Fluorescence Cystoscopy with High-Resolution Optical Coherence Tomography Imaging as an Adjunct Reduces False-Positive Findings in the Diagnosis of Urothelial Carcinoma of the Bladder", European Urology 56, 2009, pp. 914-919.
Triggs et al., "Bundle Adjustment: A Modern Synthesis", Vision Algorithms '99, LNCS 1883, pp. 298-372, 2000.
Uyttendaele et al., "Image-Based Interactive Exploration of Real-World Environments", IEEE Computer Graphics and Applications Magazine 42, May 2004, 52-63.
Waechter et al., "Let There Be Color! Large-Scale Texturing of 3D Reconstructions", Proceedings European Conference on Computer Vision, 836-850 (2014).
Yoshimura et al., "Physiology and Pharmacology of the Bladder and Urethra", Campbell-Walsh Urology, Elsevier, Chapter 60, Tenth edit edition, pp. 1786-1833.e17 (2009).
Zach et al., "Practical Methods for Convex Multi-View Reconstruction", Lecture Notes Comput Sc 6314, 354-367 (2010).
International Preliminary Report on Patentability for International Application PCT/US2016/046429, Report issued Feb. 13, 2018, dated Feb. 22, 2018, 6 Pgs.
International Search Report and Written Opinion for International Application No. PCT/US2016/046429, Search completed Sep. 20, 2016, dated Dec. 8, 2013, 9 Pgs.
Agenant et al., "Real-Time Bladder Lesion Registration and Navigation: A Phantom Study", PLOS ONE, vol. 8, No. 1, Jan. 2013, e54348, 9 pages.
Aldoma et al., "Tutorial: Point Cloud Library: Three-Dimensional Object Recognition and 6 DoF Pose Estimation", IEEE Robotics & Automation Magazine, Sep. 2012, pp. 80-91.
Allain et al., "Re-localisation of a biopsy site in endoscopic images and characterisation of its uncertainty", Medical Image Analysis, vol. 16, No. 2, 2012, pp. 482-496.
Atasoy et al., "Endoscopic Video Manifolds for Targeted Optical Biopsy", IEEE Transactions on Medical Imaging, vol. 31, No. 3, Mar. 2012, pp. 637-653.

(56) References Cited

OTHER PUBLICATIONS

Atasoy et al., "Probabilistic Region Matching in Narrow-Band Endoscopy for Targeted Optical Biopsy", Med Image Comput Comput Asst Interv, vol. 5761, 2009, pp. 449-506.

Behrens et al., "Local and Global Panoramic Imaging for Fluorescence Bladder Endoscopy", Engineering in Medicine and Biology Society, 2009. EMBC 2009. Annual International Conference of the IEEE, Conference Date: Sep. 3-6, 2009, Minneapolis, MN, USA, 5 pages.

Ben-Hamadou et al., "A Novel 3D Surface Construction Approach: Application to Three-Dimensional Endoscopic Data", Proceedings of 2010 IEEE 17th International Conference on Image Processing, Sep. 26-29, 2010, Hong Kong, pp. 4425-4428.

Ben-Hamadou et al., "Flexible calibration of structured-light systems projecting point patterns", Computer Vision and Image Understanding, vol. 117, Nov. 11, 2013, pp. 1468-1481.

Bookstein, "Principal Warps: Thin-Plate Splines and the Decomposition of Deformations", IEEE Transactions on Pattern Analysis and Machine Intelligence, vol. 11, No. 6, Jun. 1989, pp. 567-585.

Bouguet, "Camera Calibration Toolbox for Matlab", Retrieved from: http://www.vision.caltech.edu/bouguetj/calib_doc/, 2004, Last Updated: Oct. 14, 2015, 5 pages.

Boykov et al., "An Experimental Comparison of Min-Cut/Max-Flow Algorithms for Energy Minimization in Vision", IEEE Transactions on PAMI, vol. 26, No. 9, Sep. 2004, pp. 1124-1137.

Cignoni et al., "MeshLab: an Open-Source 3D Mesh Processing System", ERCIM News, vol. 73, Apr. 2008, pp. 47-48.

Clark et al., "Clinical Practice Guidelines in Oncology", Journal of the National Comprehensive Cancer Network, vol. 11, No. 4, Apr. 2013, pp. 446-475.

Cothren et al., "Gastrointestinal tissue diagnosis by laser-induced fluorescence spectroscopy at endoscopy", Gastrointestinal Endoscopy, vol. 36, No. 2, 1990, pp. 105-111.

Doignon et al., "Real-time segmentation of surgical instruments inside the abdominal cavity using a joint hue saturation color feature", Real-Time Imaging, vol. 11, 2005, pp. 429-442, Available online Aug. 18, 2005.

Durrant-Whyte et al., "Simultaneous Localization and Mapping (SLAM): Part II", IEEE Robotics & Automation Magazine, vol. 13, No. 3, Sep. 2006, pp. 108-117.

Durrant-Whyte et al., "Simultaneous Localization and Mapping: Part I", IEEE Robotics & Automation Magazine, vol. 13, No. 2, Jun. 2006, pp. 99-110.

Feldmar et al., "Extension of the ICP Algorithm to non rigid Intensity-based Registration of 3D Volumes", Retrieved from: http://www-sop.inria.fr/asclepios/Publications/Misc/CVIU-97-1.pdf, Computer Vision and Image Understanding vol. 66, Issue 2, May 1997, pp. 193-206.

Fischler, Martin A., "Random sample consensus: A paradigm for model fitting with applications to image analysis and automated cartography", Comm. of the ACM, Jun. 1981, vol. 24, Issue 6, p. 381-395.

Gal et al., "Seamless Montage for Texturing Models", Eurographics 2010, vol. 29, No. 2, 2010, 8 pgs.

Garcia et al., "Real-time 3D Modeling from Endoscope Image Sequences", IEEE International Conference on Robotics and Automation, May 13, 2009, 3 pgs.

Hartley et al., "Multiple View Geometry in computer vision", Cambridge University Press, New York, NY, 2nd edition, 2004, 673 pages.

Hernandez-Mier et al., "Fast construction of panoramic images for cystoscopic exploration", Computerized Medical Imaging and Graphics, vol. 34, No. 7, 2010, pp. 579-592.

Jacques, "Corrigendum: Optical properties of biological tissues: a review", Phys. Med. Biol., vol. 58, 2013, pp. 5007-5008.

Kazhdan et al., "Poisson Surface Reconstruction", Eurographics Symposium on Geometry Processing, 2006, 10 pgs.

Kolev et al., "Continuous Global Optimization in Multiview 3D Reconstruction", International Journal of Computer Vision, vol. 84, No. 1, Aug. 2009, pp. 80-96, First online Apr. 1, 2009.

Lempitsky et al., "Seamless Mosaicing of Image-Based Texture Maps", Computer Vision and Pattern Recognition, 2007, Conference on Jul. 17-22, 2007, Minneapolis, MN, USA, 6 pages.

Lerner et al., "Optical Coherence Tomography as an Adjunct to White Light Cystoscopy for Intravesical Real-Time Imaging and Staging of Bladder Cancer", Urology, vol. 72, No. 1, 2008, pp. 133-137.

Lingley-Papadopoulos et al., "Computer recognition of cancer in the urinary bladder using optical coherence tomography and texture analysis", J. Biomed. Opt., vol. 13, No. 2, Mar. 2008, pp. 024003-1-024003-9.

Lowe, "Distinctive Image Features from Scale-Invariant Keypoints", Retrieved from: https://www.robots.ox.ac.uk/~vgg/research/affine/det_eval_files/lowe_ijcv2004.pdf, Jan. 5, 2004, Accepted for publication in the International Journal of Computer Vision, 2004, 28 pgs.

Lurie et al., "3D reconstruction of cystoscopy videos for comprehensive bladder records", BioMedical Optics Express 2106, vol. 8, No. 4, Apr. 1, 2017, Published Mar. 8, 2017, 18 pages.

Lurie et al., "Rapid scanning catheterscope for expanded forward-view volumetric imaging with optical coherence tomography", Optics Letters, vol. 40, No. 13, Jul. 1, 2015, pp. 3165-3168.

Lurie et al., "Three-dimensional, distendable bladder phantom for optical coherence tomography and white light cystoscopy", Journal of Biomedical Optics, vol. 19, No. 3, Mar. 2014, pp. 036009-1-036009-9.

Mehmood et al., "Video summarization based tele-endoscopy: a service to efficiently manage visual data generated during wireless capsule endoscopy procedure", J Med Syst, vol. 38, No. 109, Jul. 19, 2014, 9 pages.

Miranda-Luna et al., "Mosaicing of Bladder Endoscopic Image Sequences: Distortion Calibration and Registration Algorithm", IEEE Transactions on Biomedical Engineering, vol. 55, No. 2, Feb. 2008, pp. 541-553.

Mountney et al., "Dynamic View Expansion for Minimally Invasive Surgery using Simultaneous Localization and Mapping", IEEE Eng Med Biol Soc, 2009, pp. 1184-1187.

Mountney et al., "Optical Biopsy Mapping for Minimally Invasive Cancer Screening", Med Image Comput Comput Assist Interv, 2009, pp. 483-490.

Nister et al., "Scalable Recognition with a Vocabulary Tree", IEEE Computer Vision and Pattern Recognition, 2006, 8 pgs.

Penne et al., "Time-of-Flight 3-D Endoscopy", Med Image Comput Comput Assist Interv, 12, 2009, pp. 467-474.

Ren et al., "Diagnosis of Bladder Cancer with MEMS-based Cystoscopic Optical Coherence Tomography", Urology, vol. 74, No. 6, Dec. 2009, pp. 1351-1357, doi:10.1016/j.urology.2009.04.090.

Riley et al., "Medicare Payments from Diagnosis to Death for Elderly Cancer Patients by Stage at Diagnosis", Medical Care, vol. 33, No. 8, 1995, pp. 828-841.

Sanchez et al., "Optical Coherence Tomography (OCT) as an Adjunct to Conventional Cystoscopy and Pathology for Non-Invasive Endoscopic Staging of Bladder Tumors", POD-05.06, Urology 78, Supplement 3A, Sep. 2011, S18, 1 page.

Schmidbauer et al., "Fluorescence Cystoscopy with High-Resolution Optical Coherence Tomography Imaging as an Adjunct Reduces False-Positive Findings in the Diagnosis of Urothelial Carcinoma of the Bladder", European Urology, vol. 56, 2009, pp. 914-919.

Sonn et al., "Optical Biopsy of Human Bladder Neoplasia With In Vivo Confocal Laser Endomicroscopy", The Journal of Urology, vol. 182, Oct. 2009, pp. 1299-1305.

Soper et al., "Surface Mosaics of the Bladder Reconstructed From Endoscopic Video for Automated Surveillance", IEEE Trans Biomed Eng., vol. 59, No. 6, Jun. 2012, pp. 1670-1680.

Strasdat et al., "Real-time Monocular SLAM: Why Filter?", IEEE Int Conf Robot Autom, 2010, pp. 2657-2664.

Triggs et al., "Bundle Adjustment: A Modern Synthesis", Vision Algorithms '99, LNCS 1883, pp. 298-372, 2000 (presented in two parts).

Uyttendaele et al., "Image-Based Interactive Exploration of Real-World Environments", IEEE Computer Graphics and Applications Magazine, vol. 42, May/Jun. 2004, pp. 52-63.

(56) References Cited

OTHER PUBLICATIONS

Waechter et al., "Let There Be Color! Large-Scale Texturing of 3D Reconstructions", Proceedings European Conference on Computer Vision, 2014, pp. 836-850.
Wengert et al., "Fully Automatic Endoscope Calibration for Intraoperative Use", Bild. Med 8, 2006, pp. 419-423.
Ye et al., "Online Scene Association for Endoscopic Navigation", Med Image Comput Comput Assist Interv, 2014, pp. 316-323.
Yoshimura et al., "Physiology and Pharmacology of the Bladder and Urethra", Campbell-Walsh Urology, Elsevier, Chapter 60, Tenth edit edition, 2009, pp. 1786-1833.e17 (presented in two parts).
Zach et al., "Practical Methods for Convex Multi-View Reconstruction", Lecture Notes Comput Sc 6314, 2010, pp. 354-367.
Zagaynova et al., "In Vivo Optical Coherence Tomography Feasibility for Bladder Disease", Journal of Urology, vol. 167, Mar. 2002, pp. 1492-1496.

* cited by examiner

3D RECONSTRUCTION AND REGISTRATION OF ENDOSCOPIC DATA

CROSS-REFERENCE TO RELATED APPLICATIONS

The current application claims priority to U.S. Provisional Patent Application Ser. No. 62/203,280 entitled "3D Reconstruction and Co-Registration of Cystoscopic Video Sequences for Longitudinal Studies," filed Aug. 10, 2015, and U.S. Provisional Patent Application Ser. No. 62/313,649 entitled "Registration of Free-Hand OCT Daughter Endoscopy to 3D Organ Reconstruction," filed Mar. 25, 2016, the disclosures of which are herein incorporated by reference in their entirety.

STAEMENT OF FEDERALLY SPONSERED RESEARCH

This invention was made with Government support under contract 1602118 awarded by the National Science Foundation. The Government has certain rights in the invention.

FIELD OF THE INVENTION

This invention generally relates to three-dimensional (3D) reconstruction of image data. More particularly, this invention relates to the 3D reconstruction of video data captured by endoscopes.

BACKGROUND 3D reconstruction of image data is used to render 3D computer models of objects. In particular, the 3D models may be manipulated or utilized in various applications including the areas of medical imaging, scientific research, law enforcement, film animation, and virtual reality, amongst others.

3D models may be recreated using the input of two-dimensional (2D) data, such as from video, photographs or other methods of capturing data representations of an original object. For example, 3D reconstruction from magnetic resonance imaging (MRI) scans are extensively used to allow medical professionals to review and analyze 3D brain models without necessitating surgery. In the context of law enforcement, 3D reconstruction may be employed to provide more realistic depictions of individuals, 3D models are used in film and television production to portray objects, environments or actors in a realistic manner.

Endoscopies have long been used in the medical field for visual examination of the interiors of body cavities and hollow organs. A medical professional may use an endoscope to investigate symptoms, confirm a diagnosis, and/or provide treatment. An endoscope is an instrument with a rigid or flexible tube, a lighting system to illuminate the organ, and an imaging system to transmit images to the viewer. Various types of endoscopes are available for examination of different organs, such as a cystoscope for the lower urinary tract, an enteroscope for the small intestine, a bronchoscope for the lower respiratory tract, and many others. The endoscope is typically inserted directly into the organ, and may be fitted with a further apparatus for examination or retrieval of tissue. Modem endoscopes are often videoscopes, transmitting images from a camera to a screen for real-time viewing by the health professional. The procedure may then be reviewed through video playback, or condensed into a few still images with notes and drawings.

Endoscopic data may be captured via the use of various modalities, including white light endoscopy (WLE), spectroscopy, endomicroscopy, confocal microscopy and optical coherence tomography (OCT). Mother-daughter endoscopy systems may be used, where a "mother" endoscope is complemented by a "daughter" endoscope placed into its working channel. The mother endoscope may function via a primary modality such as WLE, while the daughter endoscope may employ a secondary modality such as OCT. Video data from the two endoscopes are typically recorded and viewed separately.

SUMMARY OF THE INVENTION

Methods and systems for three-dimensional (3D) reconstruction of endoscopic data in accordance with embodiments of the invention are disclosed. In one embodiment of the invention, a method for processing a plurality of images captured by an endoscope includes preprocessing a plurality of images, the plurality of images comprising images captured by an endoscope, wherein the plurality of images includes images of at least a portion of an organ. The preprocessing includes estimating variations in light intensity within scenes captured by the plurality of images, and generating a set of color-adjusted images based on the variations in light intensity. The method further includes generating a three-dimensional (3D) point cloud representing points on a surface of the organ based on the set of color-adjusted images, defining a mesh representing the surface of the organ based on the 3D point cloud, and generating a texture of the surface of the organ based on the set of color-adjusted images.

In a further embodiment, the variations are associated with a distance between a light source and a portion of the surface of the organ.

In another embodiment, the preprocessing further includes computing at least one mask based on the variations in light intensity and at least one criterion, and wherein generating the set of color-adjusted images further comprises applying the at least one mask to the plurality of images.

In a yet further embodiment, the at least one mask includes a first mask and a second mask, and the set of color-adjusted images includes structure reconstruction images generated by applying the first mask and texture reconstruction images generated by applying the second mask.

In a still further embodiment, generating the 3D point cloud further comprises generating the 3D point cloud based on the structure reconstruction images.

In still another embodiment, generating the texture further comprises generating the texture based on the texture reconstruction images.

In a yet further embodiment, the at least one criterion includes a first criterion and a second criterion, the second criterion being more restrictive than the first criterion.

In yet another embodiment, the second criterion is defined to eliminate regions of high noise.

In a further embodiment again, the mesh comprises a triangle mesh including a set of vertices and a set of faces.

In another embodiment again, the texture comprises an image and a set of mappings between pixels of the image and vertices of the mesh.

In a further additional embodiment, the method further comprises generating camera poses associated with the plurality of images, the camera poses including position information and orientation information, wherein generating the texture is further based on the camera poses.

A computing device, according to another further embodiment of the invention, includes a processor, and a memory connected to the processor and configured to store an image processing program. The image processing program configures the processor to preprocess a plurality of images, the plurality of images comprising images captured by an endoscope, wherein the plurality of images includes images of at least a portion of an organ. The preprocessing includes estimating variations in light intensity within scenes captured by the plurality of images, and generating a set of color-adjusted images based on the variations in light intensity. The processor is further configured to generate a three-dimensional (3D) point cloud representing points on a surface of the organ based on the set of color-adjusted images, define a mesh representing the surface of the organ based on the 3D point cloud, and generate a texture of the surface of the organ based on the set of color-adjusted images.

A method for transforming one organ model into a shape of another organ model, in still another further embodiment of the invention, includes receiving correspondences, where the correspondences indicate corresponding locations between a template mesh and a conforming mesh. The template mesh models a first organ and the conforming mesh models a second organ. The method further includes estimating a rigid transformation based on the template mesh, the conforming mesh, and the correspondences, and morphing the conforming mesh into a shape of the template mesh using the rigid transformation and the correspondences.

In a still yet further embodiment, the first organ and the second organ include a single organ examined at different times.

A method for processing a plurality of images captured by a first endoscope and a set of data captured by a second endoscope, in still yet another embodiment of the invention, includes identifying a frame pair from a plurality of images and a set of data, the plurality of images comprising images captured by a first endoscope using a first modality, the set of data comprising data captured by a second endoscope using a second modality. The frame pair includes a frame image from the plurality of images and a frame data from the set of data. The method further includes detecting a footprint, wherein the footprint denotes a region within the frame image, indicates a position of the second endoscope from which the frame data was captured, and is detected by determining a transformation between a first coordinate system of the first endoscope and a second coordinate system of the second endoscope. The method further includes projecting the footprint onto a three-dimensional (3D) space to create a 3D footprint position, the 3D footprint position indicating a 3D position of the footprint in relation to the 3D space.

In a still further embodiment again, the first endoscope is a mother endoscope and the second endoscope is a daughter endoscope.

In still another embodiment again, the first modality is different from the second modality.

In a yet further embodiment, the second modality includes optical coherence tomography (OCT).

In yet another embodiment, the frame image and the frame data contain data from corresponding frames of endoscopic data capture.

In a further embodiment again, the method further includes defining an interest frame pair including an interest image from the plurality of images and an interest data from the set of data, wherein the interest image and the interest data contain data meeting at least one criterion.

In another embodiment again, the at least one criterion includes at least one selected from the group consisting of the second endoscope being visible in the interest image, and the interest data containing data with a high signal-to-noise ratio (SNR).

In a further additional embodiment, the footprint denotes a region within the interest image, and indicates a position of the second endoscope from which the interest data was captured.

In a yet further embodiment, the method further includes receiving a 3D reconstruction of an organ based on the plurality of images, wherein the 3D space includes the 3D reconstruction; and creating an overlay estimation using the 3D footprint position, the overlay estimation corresponding to one or more regions of the organ indicated within the set of data.

DETAILED DESCRIPTION

Figure 1A:
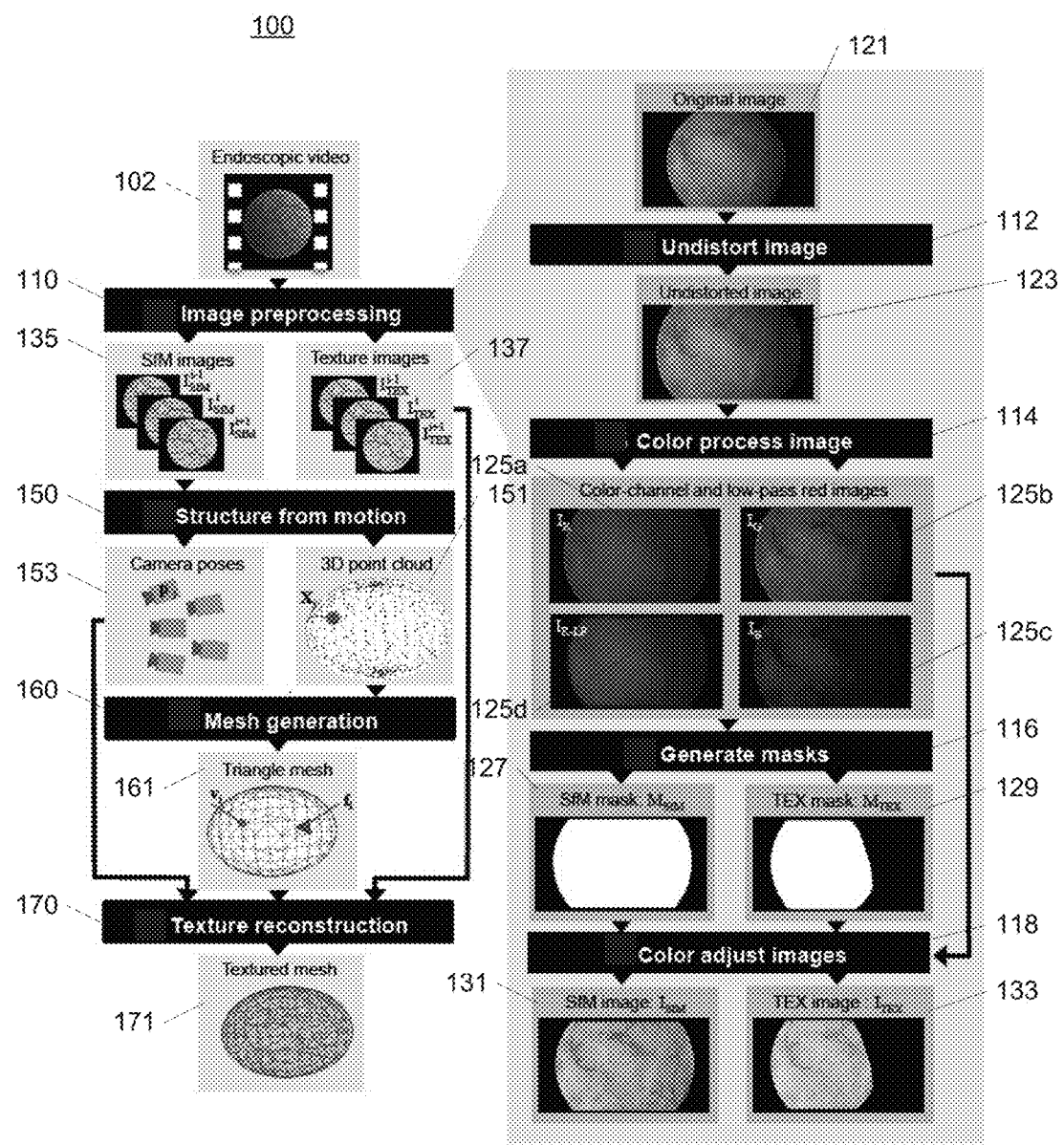
FIG. 1A is a diagram illustrating a process for generating a 3D model of an organ using endoscopy data in accordance with an embodiment of the invention.

Turning now to the drawings, illustrated are methods for 3D reconstruction of endoscopy video data, co-registration of two 3D organ models, and registration of secondary endoscopy video data to a 3D reconstruction of primary endoscopy video data, in accordance with various embodiments of the invention.

Endoscopy and its organ-specific derivatives (e.g., laparoscopy, colonoscopy, cystoscopy) play a powerful role in diagnostic imaging, surgical guidance, and cancer surveillance. Despite the rich information contained within endoscopy videos, the cumbersome nature of post-session video review drives the current clinical practice of condensing lengthy video data into a few still images and brief notes or drawings about the locations and appearance of suspicious lesions and scars. The limited data in the condensed record impedes quantitative and longitudinal studies of cancer physiology, disease process, or recurrence, and limits the impact potential of these data on clinical decision-making. The availabilty of quantitative, complete organ records for other medical imaging modalities has been of powerful effect, leading to significant clinical advances in various areas. Thus, a comprehensive representation of the endoscopy data that enables straightforward and rapid review of a single endoscopy session or comparisons across several could better support the clinical decision-making process and enable new directions for cancer research.

In many embodiments of the invention, methods are described for developing comprehensive representations of endoscopies. In particular, the use of these methods in the representation of cystoscopies have an important and clinically significant application, as bladder cancer has the highest recurrence rate of all cancers and demands at least annual surveillance through cystoscopy to monitor recurrence. Hence, the ability to carefully and comprehensively review cystoscopy data could be an important advance in the management of this disease, which also bears the distinction as being one of the most expensive cancer to treat over the lifetime of the patient.

Existing methods for creating user-friendly representations of endoscopy videos exhibit shortcomings. Video summarization reduces the size of the video but fails to localize frames in the context of their anatomical placement. Panorama generation presents wide-field views but can distort the appearance of curved regions of the anatomy. Prior 3D reconstruction techniques that capture both the 3D organ shape and appearance can enable depiction of full organs and localization of individual regions to anatomical locations in the organ. However, most existing approaches to 3D reconstruction (e.g., for laparoscopic surgery) have insufficient field of view to reconstruct a 3D model of a full organ, and those that can do so typically function only in tandem with significant modifications to the standard clinical workflow (e.g., prescribed scan patterns) or require additional hardware (e.g., structured light illumination projectors, time of flight cameras, or optical position trackers). These hardware requirements often come with a hefty infrastructure cost as well as a steep learning curve for clinician training and are therefore burdensome to adopt.

According to several embodiments of the invention, as shown in FIG. 1A, a method 100 performs 3D reconstruction of an organ from endoscopic video 102 (e.g., a bladder from white light cystoscopy (WLC) video), captured using standard clinical hardware. In some embodiments of the invention, the method 100 may involve only a minor modification to the standard clinical scan pattern. The reliance on standard office tools makes this approach easily and rapidly translatable for clinical deployment. In other embodiments of the invention, a method 500 (see FIG. 5A) performs co-registration of two 3D organ models obtained across multiple imaging sessions of the same patients. In some embodiments of the invention, the generation of 3D organ models and registration of models from multiple imaging sessions are combined. This combination allows for studies of longitudinal endoscopy data to compare the appearance of an organ over time, having implications for new studies in the evolution and recurrence of cancer and other disease development.

Additionally, as the clinical need for early detection of cancer and other diseases demands better imaging tools, primary-secondary endoscopy systems (e.g., mother-daughter endoscopy), where a primary endoscope of a first modality (e.g., a "mother" white light endoscope (WLE)) is complemented by a secondary endoscope of a second modality (e.g., a "daughter" OCT endoscope) placed into its working channel, are becoming more prevalent. Secondary endoscopes from imaging modalities, including but not limited to spectroscopy, endomicroscopy, or optical coherence tomography (OCT), provide additional contrast and resolution that permit the detection or classification of cancerous tissue in a breadth of endoscopy applications (e.g., pulmonology, gastroenterology, urology) for which the primary modality such as WLE may be insufficient on its own. However, because the primary and secondary endoscopic data are recorded and viewed separately, the onus falls to the physician to remember or painstakingly record where the secondary endoscopy data were collected relative to the primary. This need for cognitive fusion hinders many opportunities for advanced analysis, such as the creation of a comprehensive map of tumor margins from both imaging modalities.

Embodiments of the present invention introduce a method to register regions of secondary-endoscopy images to a 3D image reconstruction of an organ created from primary endoscopic data. The 3D image reconstruction may be generated by methods such as, but not limited to, reconstruction methods similar to those discussed with respect to FIG. 1A according to some embodiments of the invention. The method may detect the pose of the secondary endoscope (i.e., its position and orientation) with respect to the primary endoscope. In a number of embodiments of the invention, the relative pose between the secondary and primary endoscopes, along with the known geometry of the secondary endoscope, dictate the region in the primary image from which the secondary-endoscopy data are collected. This region may then be projected into 3D using the reconstructed organ model and the global pose of the primary image. Hence, embodiments of the invention enable both primary- and secondary-endoscopy data to be localized to the appropriate anatomical location.

Systems and methods in accordance with many embodiments of the invention focus on creating a comprehensive record of the entire imaging session, which may permit tracking of the organ appearance across several imaging sessions. Most existing methods of 3D reconstruction represent the position of the secondary endoscope as a single point rather than a region, which inhibits generation of larger fields of view of secondary-endoscope data. These methods also rely on specific endoscope motions or manual input to detect when important secondary-endoscopy data are collected (i.e., when the secondary endoscope is in contact with the tissue), which further hamper their translational potential. The method according to many embodiments of the invention avoids these problems by automatically detecting these important secondary-endoscopy data through image analysis.

Method for 3D Reconstruction

In some embodiments of the invention, a 3D reconstruction method may generate a 3D model of an organ, based on 2D endoscopic data. The 2D data may include video or images captured by an endoscope during examination of the organ. In a number of embodiments of the invention, the method may be implemented without significant modifications to standard clinical hardware or disruption to the clinical workflow. According to many embodiments of the invention, the reconstruction method may reconstruct a full 3D model of an entire organ, which may be retained for future review. In certain embodiments of the invention, two reconstructions from different endoscopy sessions may be co-registered, aiding in ease of comparison and monitoring. A method 100 that generates a full 3D model of an organ using endoscopic data in accordance with an embodiment of the invention is illustrated in FIG. 1A.

(1) Image Preprocessing. As shown in FIG. 1A, the inset highlights the operations 112-118 performed during the image preprocessing 110 of the captured images, according to several embodiments of the invention. A subset of frames ("keyframes") such as image 121 are selected (110) from the video and are undistorted (123) based on a calibrated camera model. According to some embodiments of the invention, each keyframe 121 may be color-adjusted twice (114-118) to generate distinct input images 131/135 and 133/137 that can be utilized to perform structure-from-motion (150) and texture-generation (170) processes, respectively.

(2) Structure-from-Motion (SfM) Extraction. According to many embodiments of the invention, suitable keyframes are selected (150), from which interest points are detected, and feature descriptors for those interest points are matched between the images. An initial sparse point cloud 151—a representative set of 3D points $(X_i)$ on the surface of the organ—is generated, and camera poses $(p_j)$ 153 can be calculated to describe the position and orientation of the cystoscope in each keyframe. In some embodiments of the invention, structure-from-motion 150 computations are implemented using an open-source SfM library, which may be optimal for refining the operations and configuration parameters of the pipeline.

(3) Mesh Generation. According to several embodiments of the invention, a dense surface of the organ is generated (160) based on the 3D point cloud 151. The surface of the organ may be represented by a mesh, such as (but not limited to) a triangle mesh 161. A combination of a custom point cloud preprocessing technique with a Poisson reconstruction, a state-of-the-art mesh-generation method, may be employed. As can readily be appreciated, the specific process utilized is typically dependent upon the requirements of a given application.

(4) Texture Reconstruction. According to many embodiments of the invention, the texture images ($I_{TEX}$) 137, camera poses (p) 153, and triangle mesh 161 are used to map (170) a surface texture including selected regions from the input images 137 onto the triangle mesh 161, giving the 3D reconstruction (textured mesh 171) the appearance of the organ surface. In many embodiments of the invention, the quality of the output texture is related to the particular implementation of image preprocessing 110.

Each operation within the 3D reconstruction method 100 in accordance with a number of embodiments of the invention is described in further detail below. While many specific embodiments are described above with reference to FIG. 1A, any of a variety of image processing operations can be utilized to perform 3D reconstruction of an organ cavity using images captured by one or more endoscopes as appropriate to the requirements of specific applications in accordance with embodiments of the invention.

Image Preprocessing

According to some embodiments of the invention, the goal of the image-preprocessing process 110 is to produce input images suitable for use in SfM 150 and texture-reconstruction 170. In some embodiments of the invention, the image preprocessing 110 involves distortion correction 112, color processing 114, mask generation 116, and color adjustment 118. The output of the image processing 110 may be two sets of images, which may include SfM images 135 and texture-reconstruction (TEX) images 137. In a number of embodiments of the invention, the SfM images 135 may be grayscale and the TEX images 137 may be in color. In certain embodiments of the invention, these outputs may serve as inputs for SfM extraction 150 and mesh generation 160, respectively.

Distortion correction 112 according to several embodiments of the invention removes radial and tangential distortions that warp the images due to non-idealities endemic to the optics of the endoscope based on camera calibration. In some embodiments of the invention, the camera may be calibrated using images of a planar grid of circles with a T-shaped alignment mark, which is better suited for estimating the large distortions that exist at the edges of a circular field of view than its more traditional counterpart of a rectangular checkerboard pattern. As can be readily appreciated, a variety of shapes and forms can be utilized to implement the calibration target in accordance with several embodiments of the invention. In post-processing, a grid may be fit to the center of the detected circles in the calibration images iteratively starting from the T-shaped alignment marks, and the grid may be used to estimate the distortion and intrinsic camera parameters of the endoscope. In some embodiments of the invention, time-varying intrinsic parameters may be handled with self-calibration techniques at the expense of significantly increased complexity and less robustness.

Color processing 114, according to many embodiments of the invention, first separates the image into its red, green, and blue color channels ($I_R$, $I_G$, and $I_B$, respectively), and generates $I_{R-LP}$, the red channel image low-pass filtered using, for example, a 2D Gaussian kernel with a standard deviation of 10 pixels. The low-pass filtered red channel image ($I_{R-LP}$) may approximate the lighting intensity at each pixel in the image. Thus, this image may help minimize variations in lighting across images due to the variation in the distance and angle between the organ surface and the endoscope (and therefore light source). As captured within an image, regions farther away from the light source appear darker because the light source becomes more diffuse with increased distance, and regions at a steeper angle with respect to the illumination direction appear darker as less light is collected from these locations. With regard to certain organs, such as a bladder, the red channel can approximate the lighting intensity across the image in the organ. Due to the shallow (starting less than 100 μm from the surface) and spatially heterogeneous location of blood vessels and significantly lower absorption coefficient of hemoglobin for red wavelengths (~650 nm) compared with blue and green, the red channel may contain limited vascular contrast (and thus just mimics the lighting intensity). On the other hand, the blue and green channels may show a higher contrast vascular pattern.

In a number of embodiments of the invention, from the lighting intensity estimate $I_{R\text{-}LP}$, masks 127/129 may be generated (116) for images, which may be used in SfM extraction (150) and texture reconstruction (170), that identify which pixels are within the circular field of view of the endoscope. Separate masks 127 and 129 may be generated for each of the SfM and TEX image datasets, respectively. The SfM mask ($M_{SfM}$) according to some embodiments of the invention is computed by binarizing $I_{R\text{-}LP}$. An initial mask may be computed where all pixels in $I_{R\text{-}LP}$ with intensities greater than a binarization threshold of a certain threshold, such as (but not limited to) 10, are set to a value of 1 while other pixels are assigned a value of zero. The initial mask may then be eroded with a disk of radius 30 to smooth the mask and eliminate holes. In some embodiments of the invention, the binarization threshold is selected by determining the value that separates the bright circular image from the dark (but often non-zero) pixels captured outside the circular image area. This image mask thus prevents detection of interest points wen outside the circular field of view and allows interest points that have a spatial support that overlaps with the boundary of the circular field of view (i.e., have descriptors that are computed with pixels outside the mask) to be discarded.

According to several embodiments of the invention, the initial mask for the texture images ($M_{TEX}^{init}$) is similarly computed by binarizing $I_{R\text{-}LP}$ and applying a disk erosion. However, a higher binarization threshold (e.g., 100 vs. 10 for $M_{SfM}$) may be selected. A higher threshold eliminates dark regions of the image and may be chosen to eliminate regions in the image with high noise to yield a higher-quality texture. These dark regions may not be masked for the SfM images, where it is preferable to have a field of view as wide as possible to detect interest points. According to some embodiments of the invention, the final texture mask, $M_{TEX}$, is the convex hull of the largest contour $M_{TEX}^{init}$. The convex polygon-shaped mask prevents introducing "holes" (small, dark textureless regions) into the final texture.

In accordance with many embodiments of the invention, the masks 127/129, color-channel images 125a-c, and low-pass red image 125d are used to generate (118) the final output images 131/135 and 133/137. With respect to the SfM images 135, the goal according to some embodiments of the invention is to achieve high-contrast images with consistent lighting, to maximize the number of interest points that are extracted and that can be matched robustly across images. Variations in lighting can lead to corruption of feature descriptors due to the lighting gradients, and low contrast can lead to interest points being rejected due to lack of significant contrast. These issues are endemic to creating a grayscale image from a color image. Hence, it may be preferable to generate SfM images 135 by normalizing the green-channel image (which has the highest contrast of the three image channels) by an approximate lighting intensity given by the red channel image (e.g., $I_{SfM}^{ij} = M_{SfM}^{ij} I_G^{ij} I_R^{ij}$ for pixel (i,j)).

In several embodiments of the invention, the final TEX images 137 are similarly computed by normalizing each of the channels by the estimate of the lighting intensity (e.g., $I_{TEX}^{ij} = M_{TEX}^{ij} [I_R^{ij} \ I_G^{ij} \ I_B^{ij}]/I_{R\text{-}LP}^{ij}$ for pixel (i,j)). The differing formulation of the two normalization equations reflects the large-area, grayscale nature of the SfM images 135 compared to the smaller-area, color TEX images 137.

Although methods of image pre-processing are described above with respect to FIG. 1A, any of a variety of methods for processing images utilizing masks and color adjustments as appropriate to the requirements of a specific application can be utilized in accordance with embodiments of the invention. In addition, in some embodiments of the invention, the image pre-processing may include accounting for lighting variation, such as by utilizing the reconstructed surface and model of the endoscope. Methods for sparse reconstruction of a surface in accordance with a number of embodiments of the invention are discussed further below.

Structure from Motion (SfM)

In many embodiments of the invention, SfM extraction (150) estimates the structure of the organ from movement of features observed during motion of the endoscope camera. Specifically, this process 150 may, according to several embodiments of the invention, generate camera poses 153 (position and orientation) associated with the images of the endoscopy and a point cloud 151—a set of 3D points that represent estimated points on the surface of the organ that were visible in several images in the captured video data. The point cloud 151 may be a sparse reconstruction of the surface of the organ. In some embodiments of the invention, an assumption may be made that the organ remains rigid. For example, this would be a valid assumption in the case of a bladder during a cystoscopy, given the standard practice of distention during the procedure.

Two main architectures exist for SfM pipelines, sequential and hierarchical. Sequential-SfM operates with video data and registers new keyframes to the 3D reconstruction acquired using the previous keyframes (i.e., the reconstruction successively expands), but requires additional building blocks for a robust reconstruction, such as a method to initialize the point cloud 151 and camera poses 153. Hierarchical-SfM pipelines, by contrast, operate by first building several small reconstructions and then aligning them to form a larger reconstruction. This alignment process enables robust detection and handling of many loop closures and does not suffer from initialization challenges endemic to sequential-SfM pipelines. It may be preferable, according to certain embodiments of the invention, to utilize a hierarchical rather than a sequential approach. Although a hierarchical-SfM pipeline is more computationally intensive, the context of organ reconstruction may not require real-time performance, and the added robustness may be important to avert the failures common in sequential-SfM, in cases where endoscopic image quality may be poor.

In many embodiments of the invention, the SfM process (150) comprises operations such as keyframe selection, two-view reconstruction (of camera poses 153 and 3D points 151) through correspondence detection, multi-view reconstruction, and bundle adjustment, which refines the camera poses 153 and 3D points 151. In some embodiments of the invention, keyframe selection involves a temporal downsampling (e.g., by a factor of 4 from a 30-fps video sequence) of the original video sequence to eliminate redundant information captured in successive images. More elaborate schemes, such as by relying on image quality metrics such as "blurriness" to increase the difference in camera position between sequential keyframes, may also be employed to further reduce the computational burden of downstream aspects of the process.

In certain embodiments of the invention, two-view reconstruction, multi-view reconstruction and bundle adjustment may be implemented using an open-source SfM application. Two-view reconstruction of the camera poses 153 and 3D points 151 representing locations on the organ surface may be accomplished according to some embodiments of the invention by detecting interest points in each keyframe and then identifying correspondences between related interest points from pairs of keyframes. In a number of embodiments of the invention, a feature descriptor is extracted at each interest point and a correspondence is established if the descriptors of two interest points from two different keyframes are sufficiently similar. This process leads to robustly re-detectable interest points and stable descriptors despite changes in the image (e.g., due to perspective distortions after moving the camera, lighting variation, or compression artifacts). SIFT interest points and descriptors may be used in some embodiments of the invention. SIFT features are based upon image gradients and are invariant to image intensity, rotation, and scale and robust to affine transformations up to 30°. These properties of SIFT features may be adequate for endoscopy images, as the organ may be imaged at an angle nearly normal to the surface. Although the endoscopy light source may cause lighting gradients in the endoscopy images, the image pre-processing (110) operations of many embodiments of the invention enables meaningful interest points to be detected even in these conditions.

Since descriptors only capture a local "snapshot" around an interest point, the first list of correspondences computed may contain a significant number of outliers. The outliers may be filtered using RANdom SAmpling and Consensus (RANSAC), which simultaneously estimates both the relative transformation (camera poses) between a pair of keyframes as well as their shared (inlier) correspondences. RANSAC is an iterative process that employs a hypothesize-and-verify scheme. In each iteration, a random subset of correspondences is sampled and that subset is used to compute a hypothesis. In case of rigid transformation, a subset containing as few as 5 correspondences may be used to compute an essential matrix as a hypothesis which encodes the relative transformation. A consensus set is subsequently computed by finding all correspondences that agree with the essential matrix (validation). If the size of the consensus set is sufficient (e.g., above 20 correspondences), this keyframe pair may be deemed geometrically consistent.

In some embodiments of the invention, to determine which pairs of keyframes to subject to RANSAC, for each query keyframe a vocabulary tree may be used to generate a short-list of promising keyframes that might have viewed the same area of the organ. The vocabulary tree may assign the feature descriptors from all keyframes to leaves in its tree so that similarities between keyframes can be quickly computed on the basis of having features that have been assigned to similar leaves. A leaf itself may represent a set of shared properties between feature descriptors assigned to it, as determined by the dataset with which the tree was trained. In certain embodiments of the invention, the vocabulary tree may be pre-trained on a generic set of images rather than those specific to data of a particular organ. In other embodiments of the invention, the vocabulary tree may be trained with images specific to a particular organ (e.g., cystoscopic images). For each keyframe, a short-list of similar keyframes may be extracted and used in a subsequent, computationally more expensive geometric-verification operation (i.e., RANSAC).

With the relative poses between camera pairs estimated, each interest-point correspondence according to several embodiments of the invention can be triangulated into a 3D point ($X_i$) by determining the intersection of the two rays that pass through the center of the camera and the interest point associated with the relevant keyframe. The relative camera pose between two images and associated 3D points may be referred to as a two-view reconstruction, as the structure of the sample and motion between images is determined for just two images. In a number of a embodiments of the invention, given two-view reconstructions between many pairs of keyframes, the hierarchical-SfM pipeline may attempt to combine reconstructions that share common keyframes into larger reconstructions. Specifically, triplets of keyframes may first be identified that result in consistent three-view reconstructions of the jointly observed interest points and then combined to form a single 3D reconstruction in a model generation operation. According to some embodiments of the invention, the operations may be formulated in a robust way in order to handle spurious results of prior processing (i.e., triplets that seem geometrically inconsistent will get removed).

In many embodiments of the invention, the hierarchical-SfM pipeline yields two outputs that are expressed in a single global coordinate frame: (1) a set of camera poses, which represents the position and orientation of the cameras corresponding to keyframes, and (2) a sparse point cloud, which contains a set of 3D points that correspond to positions on the surface of the bladder wall and are generated from triangulating 2D-interest-point correspondences into 3D. These outputs may then be refined in the SfM process, a bundle adjustment operation.

In several embodiments of the invention, the bundle adjustment operation performs a non-linear refinement of the locations of 3D points, camera positions and orientations such that the reprojection error between reconstructed 3D points projected into the camera and the measured 2D-interest-point correspondences in the image is minimized:

$$\min_{R,t,X} \sum_{(i,j)\in\Omega} \|x_j^i - \Pi(K(R_i X_j + t_i))\|_2^2, \qquad (1)$$

where i and j represent the index of the $i^{th}$ camera and $j^{th}$ 3D point, respectively, $x_j^i$ is the 2D image point corresponding to camera i and 3D point j, $\Omega$ is the set of inlier correspondences, and $\Pi: \mathbb{R}^3 \to \mathbb{R}^2 : \Pi(X)$ is the perspective projection function with $R_i$ and $t_i$ being the rotation matrix (orientation) and translation (position) of camera i. The optimization over the rotation matrices $R_i$ may be performed with multiplicative updates $R_i := \Delta_i R_i$, with incremental rotations $\Delta_i$ computed in the tangent plane to the manifold of the special orthogonal group using the exponential map). For increased robustness, the L2-norm may be replaced with a robust cost function such as the Huber cost or a truncated L2 cost.

According to many embodiments of the invention, the final output of the SfM operation 150, contains a sparse 3D point cloud 151 together with camera poses 153 for each keyframe, which may have been reconstructed up to a scale factor. In a number of embodiments of the invention, the sparse point cloud 151 may used in mesh generation 160, and the camera poses 153 may be used texture reconstruction 170.

Although methods of estimating structure from motion are described above with respect to FIG. 1A, any of a variety of methods for estimating the structure of an organ as appropriate to the requirements of a specific application can be utilized in accordance with embodiments of the invention. In addition, in some embodiments of the invention, 3D reconstruction could be achieved with a sequential structure from motion (or SLAM) approach. Optionally, point cloud (or mesh) and camera poses may be adjusted based upon photometric costs to achieve a more consistent reconstruction. According to certain embodiments of the invention, a shape prior (i.e., approximate organ shape) and/or knowledge of a rough scan pattern are used to improve the shape of the reconstructed organ. The shape prior may come from a secondary medical image such as an MRI or CT scan. 3D reconstruction according to some embodiments of the invention may be performed with an additional sensor on the endoscope. This reconstruction could be done using a visualinertial simultaneous localization and mapping (SLAM) approach. Methods for mesh generation in accordance with a number of embodiments of the invention are discussed further below.

Mesh Generation

According to many embodiments of the invention, the mesh generation operation 160 defines a surface in the form of a triangle mesh 161 from the sparse point cloud 151 computed previously. In some embodiments of the invention, the triangle mesh 161 includes a set of vertices (3D points), $v_i$, and faces (represented by three vertices), $f_j$. This representation may be combined with computer graphics tools to visualize and map a texture to the organ surface. As an example, the mesh generation process may be implemented with a combination of the Point Cloud Library and/or Meshlab. As can readily be appreciated, the specific implementation utilized is typically dependent upon the requirements of a given application.

In some embodiments of the invention, a typical approach to generate a mesh densifies a sparse point cloud into a semi-dense point cloud. In other embodiments of the invention, given the density of points in the sparse point cloud and the relative smoothness of the organ surface, a dense reconstruction may not be necessary. Several techniques exist for converting a point cloud to a triangle mesh. In some embodiments of the invention, the Poisson surface reconstruction method is used for its robustness to noise and tendency to generate watertight meshes, which may effectively estimate a full organ surface even in the absence of imaging over the entire surface.

According to many embodiments of the invention, the mesh generation operation 160 refines the point cloud 151 through statistical-outlier removal (i.e., 3D points that lie relatively far from other points are removed). Also employed may be Poisson-disk sampling, which subsamples the point cloud 151 to generate a more uniformly distributed point cloud on a surface. The normal of each point may be computed based on a function of neighboring points. Finally, Poisson surface reconstruction may generate a mesh using the surface normal and location of the 3D points, which in some embodiments of the invention are assumed to lie on the true surface of the bladder. As can readily be appreciated, the specific process utilized is typically dependent upon the requirements of a given application.

Although methods of mesh generation are described above with respect to FIG. 1A, any of a variety of methods for defining a surface of an organ as appropriate to the requirements of a specific application can be utilized in accordance with embodiments of the invention. In addition, in some embodiments of the invention, the mesh generation method could utilize alternative techniques for transforming the point cloud into a 3D mesh, such as tetrahedralization with subsequent graphcut using unary and pairwise potentials. Methods for texture reconstruction in accordance with a number of embodiments of the invention are discussed further below.

Texture Reconstruction

While the SfM 150 and mesh generation 160 operations capture the geometry of the organ (i.e., 3D mesh 161) and camera poses 153, the appearance of the organ may be captured with a texture according to many embodiments of the invention. In some embodiments of the invention, the texture is stored as an image with mappings between mesh vertices and pixel coordinates. The "texturing" process may overlay sections of real image data onto the 3D surface described by the mesh 161, much like wrapping a crumpled foil ball in printed paper. Texture reconstruction 170 of some embodiments of the invention thus selects and combines input images ($I_{TEX}$) to generate an accurate, high-quality texture and, therefore, a high-quality organ texture appearance.

To select the input images for each face from which the texture patches will be extracted, certain embodiments of the invention first identify which faces can be seen by each camera. A mesh face may be projected onto a virtual camera (or equivalently onto the image plane of the camera) with exactly the same parameters as the real camera of a given keyframe, based on the camera poses 153. In some embodiments of the invention, it is assumed that if the face is projected to within the boundaries of the image plane, it is visible to the camera.

In practice, the projected face may be visible in multiple keyframes. Hence, it may be necessary to select a single image or to combine the pixels of multiple images to generate a high-quality texture for that face. As naive schemes, such as averaging, result in blurred textures or ghosting artifacts, many embodiments of the invention use a view-selection scheme to select an ideal input image for each face (i.e., that with a non-blurry texture and having a high density of pixels for a given face). To reduce the risk of introducing noticeable seams at the junction of neighboring faces sourced from different input images, certain embodiments of the invention formulate a joint-optimization problem that selects an appropriate image for each face while favoring the appropriation of textures of neighboring faces from the same image. The optimization problem consists of a discrete-face-labeling problem and a subsequent blending of texture seams. One approach that may be followed, according to some embodiments of the invention, includes the following: Let K denote the total number of cameras. The labeling problem assigns a label $l_i \in 1, \ldots, K$ to each face $f_i$ encoding the most appropriate image for defining the appearance of that face. Specifically, the labeling minimizes the following energy:

$$E(l) = \Sigma_{f_i \in faces} E_d(f_i, l_i) + \Sigma_{(f_i, f_j) \in Edges} E_s(f_i, f_j, l_i, l_j)$$

The energy formulation seeks to balance selecting high-quality labelings for each face ($E_d$) while minimizing seams between adjacent faces ($E_s$). The energy-data term $E_d(F_i, l_i)$ may be computed for camera k as the gradient magnitude in image k integrated over the area of the projected face $F_i$. This formulation of the energy term ensures that there is a large and sharp projection area of face i in camera k, suggesting the camera that captured this region of tissue was in close proximity to the tissue surface and its optical axis was nearly to orthogonal to the surface normal. Additionally, the gradient magnitude favors high contrast, so the image is in focus and not blurry. In some embodiments of the invention, the Potts model $E_s=[l_i \neq l_j]$ is used for the smoothness term. This term effectively creates large regions of contiguous faces that are textured by the same image. More complex, pairwise potentials could easily be introduced, but at the expense of higher computational demands (e.g., based on image-gradient information across the seam). Minimization of the aforementioned energy term results in a standard discrete-labeling problem with pairwise potentials that can be solved with graph cuts and alpha expansion. After labeling the faces, the texture may be blended at the seams to further minimize discontinuities. A coarse per-vertex color alignment is computed first, followed by Poisson image blending on each face.

In many embodiments of the invention, the texture reconstruction process 170 produces a texture image (i.e., image that captures the appearance of the surface of the mesh) with a mapping between pixel coordinates and mesh vertices. Taken with the 3D mesh 161, this generates a textured mesh 171—an object shaped like the organ with the appearance of the organ's surface.

Although methods of texture reconstruction are described above with respect to FIG. 1A, any of a variety of methods for generating a texture of an organ as appropriate to the requirements of a specific application can be utilized in accordance with embodiments of the invention. In addition, in some embodiments of the invention, the texture generation method may utilize an alternative technique for choosing high quality images for each face of the mesh. Flow charts for the 3D reconstruction method according to some embodiments of the invention are described below.

3D Reconstruction Process

Figure 1B:
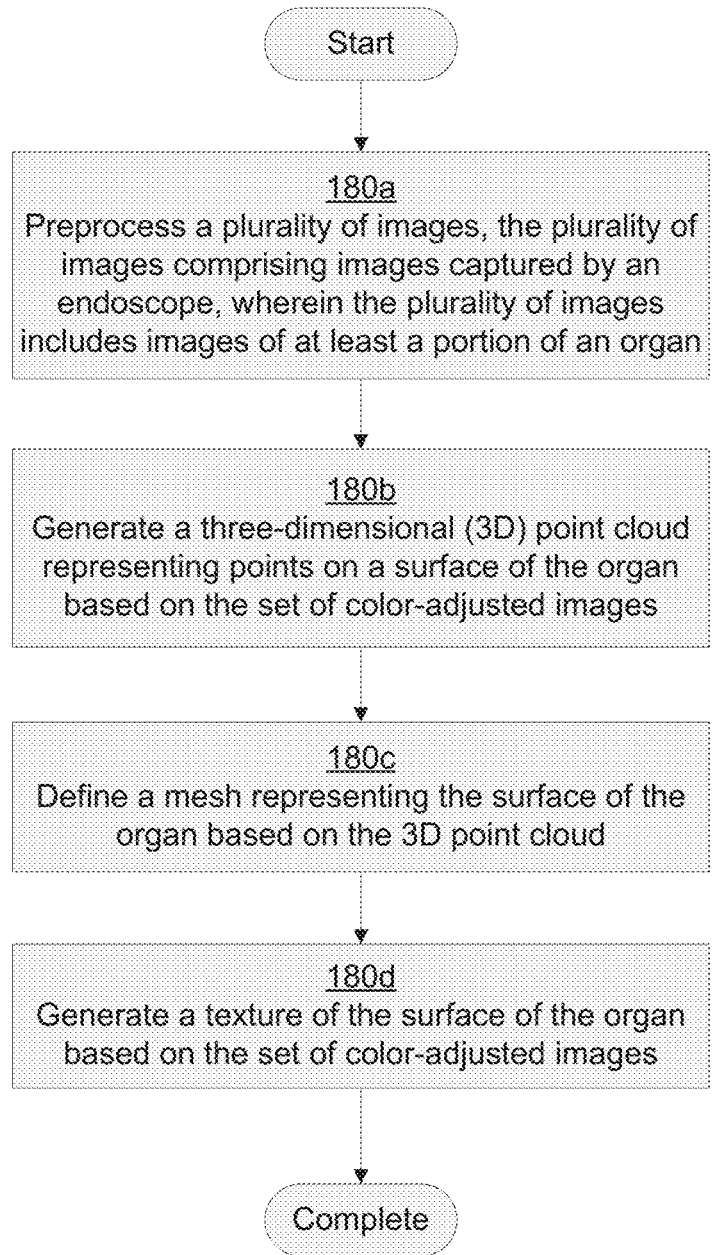
FIG. 1B is a flow chart illustrating a method for processing a plurality of images captured by an endoscope in accordance with an embodiment of the invention.

A reconstruction method 180 for processing a plurality of images captured by an endoscope, according to many embodiments of the invention, is shown in FIG. 1B. The reconstruction method 180 may include preprocessing (180a) a plurality of images, the plurality of images comprising images captured by an endoscope, wherein the plurality of images includes images of at least a portion of an organ.

Figure 1C:
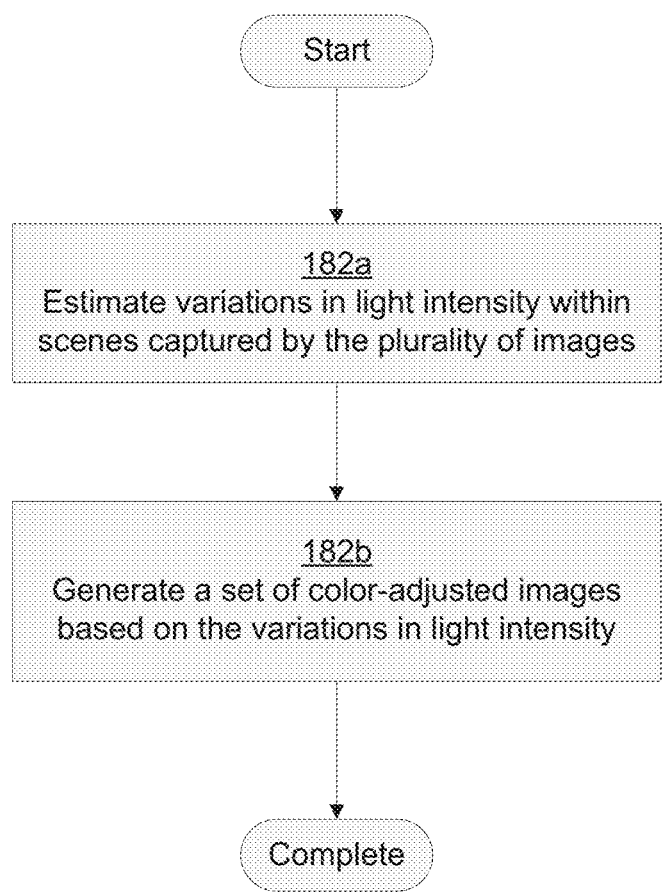
FIG. 1C is a flow chart illustrating a method for preprocessing images in accordance with an embodiment of the invention.

FIG. 1C shows a preprocessing method 182 according to several embodiments of the invention. Preprocessing method 182 may include estimating (182a) variations in light intensity within scenes captured by the plurality of images. In some embodiments of the invention, the variations are associated with a distance between a light source and a portion of the surface of the organ. In certain embodiments of the invention, during preprocessing 182, image distortion of the images may also be corrected. In several embodiments of the invention, the preprocessing method 182 may also include generating (182b) a set of color-adjusted images based on the variations in light intensity.

Further, according to several embodiments of the invention, preprocessing method 182 may include computing at least one mask based on the variations in light intensity and at least one criterion. Generating the set of color-adjusted images may in some embodiments of the invention include applying the at least one mask to the plurality of images. In certain embodiments of the invention, the at least one mask includes a first mask and a second mask, and the set of color-adjusted images includes structure reconstruction images generated by applying the first mask and texture reconstruction images generated by applying the second mask. In some embodiments of the invention, the at least one criterion may include a first criterion and a second criterion. The second criterion may be more restrictive than the first criterion, and the second criterion may optionally be defined to eliminate regions of high noise.

Referring again to FIG. 1B, reconstruction method 180 may in some embodiments of the invention include generating (180b) a three-dimensional (3D) point cloud representing points on a surface of the organ based on the set of color-adjusted images. In certain embodiments of the invention, reconstruction method 180 may further generate camera poses associated with the plurality of images, where the camera poses include position information and orientation information. The 3D point cloud and/or camera poses may be generated based on the structure reconstruction images. A mesh may be defined (180c), according to a number of embodiments of the invention, and may represent the surface of the organ. The mesh may be defined based on the 3D point cloud, and may comprise a triangle mesh including a set of vertices and a set of faces. According to many embodiments of the invention, a texture of the surface of the organ may be generated (180d). This texture may be generated based on the set of color-adjusted images. In some embodiments of the invention, the texture may be generated based on the texture reconstruction images and/or the camera poses. The texture may comprise an image and a set of mappings between pixels of the image and vertices of the mesh. In some embodiments of the invention, the texture may comprise more than one input or processed images. According to certain embodiments of the invention, reconstruction method 180 may further comprise mapping the texture to the mesh to create a 3D reconstruction of the organ.

Although methods of 3D reconstruction are described above with respect to FIGS. 1A-1C, any of a variety of methods for generating a 3D model of an organ as appropriate to the requirements of a specific application can be utilized in accordance with embodiments of the invention. According to certain embodiments of the invention, the 3D reconstruction method may be extended to acquire data. This acquisition of data may include a protocol that facilitates collection of data that can be reconstructed using SLAM, and provides a way to obtain a good initialization of the 3D model. The reconstruction pipeline may optionally account and/or correct for changes in the shape of the organ. Computer systems for image processing in accordance with a number of embodiments of the invention are discussed below.

Computer Systems for Image Processing

Figure 1D:
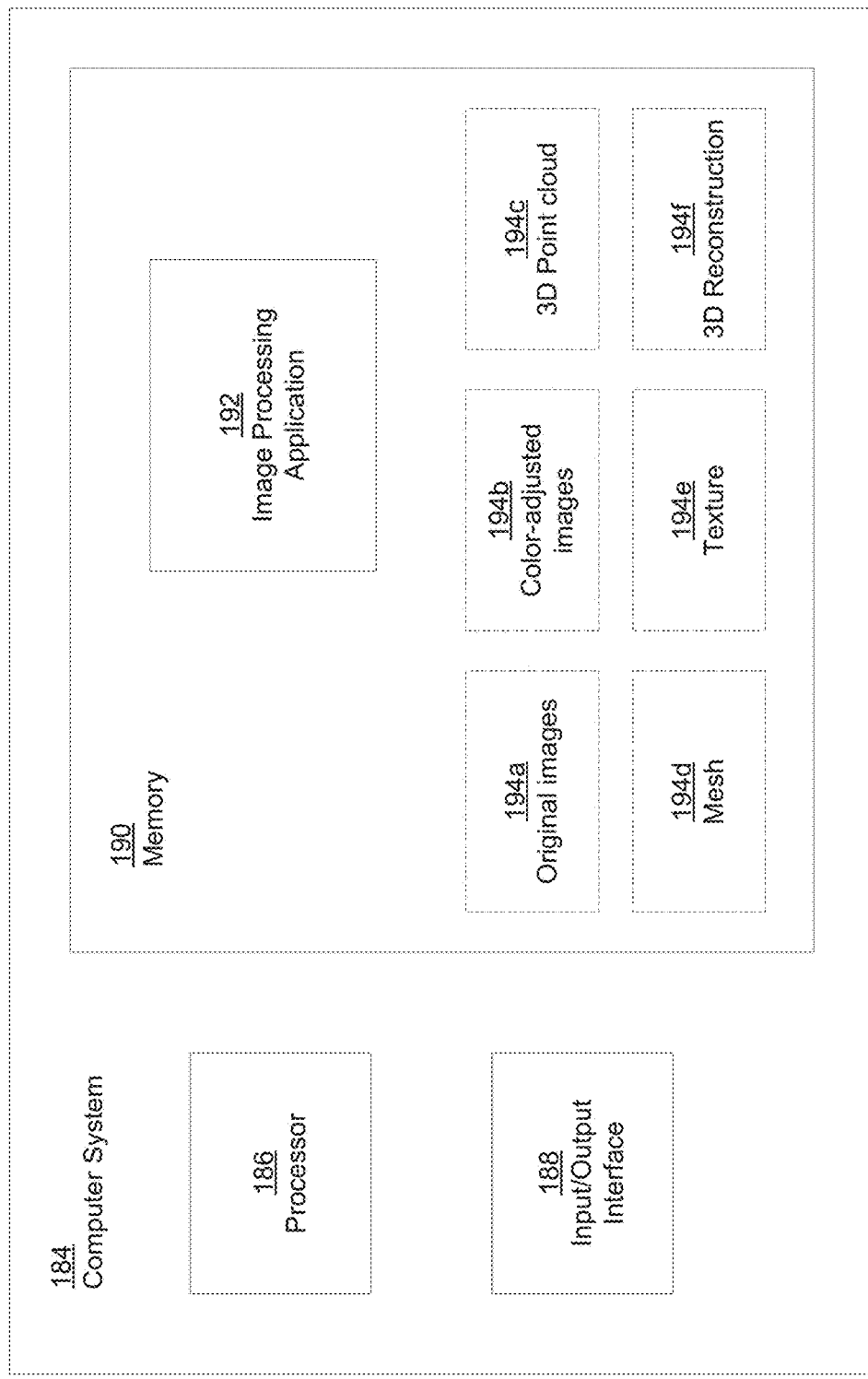
FIG. 1D is a diagram of a computer system in accordance with an embodiment of the invention.

Turning now to FIG. 1D, a computer system 184 may be implemented on a single computing device in accordance with some embodiments of the invention. The computer system 184 may be a personal computer, a laptop computer, and/or any other computing device with sufficient processing power for the processes described herein. The computer system 184 includes a processor 186, which may refer to one or more devices within the computing device that can be configured to perform computations via machine readable instructions stored within a memory 190 of the computer system 184. The processor may include one or more microprocessors (CPUs), one or more graphics processing units (GPUs), and/or one or more digital signal processors (DSPs). According to other embodiments of the invention, the computer system may be implemented on multiple computers.

In a number of embodiments of the invention, the memory 190 may contain an image processing program 192 that performs all or a portion of various methods according to embodiments of the invention described throughout the present application. As an example, processor 186 may perform the reconstruction method 180, during which memory 190 may be used to store various intermediate processing data such as the original plurality of images 194*a*, color-adjusted images 194*b*, the 3D point cloud 194*c*, the mesh 194*d*, the texture 194*e*, and the final 3D reconstruction 194*f*.

In some embodiments of the invention, the computer system 184 may include an input/output interface 188 that can be utilized to communicate with a variety of devices, including but not limited to a projector, a camera, and/or other display devices. As can be readily appreciated, a variety of software architectures can be utilized to implement a computer system in accordance with several embodiments of the invention.

Although computer systems and processes for processing images and performing actions based thereon are described above with respect to FIG. 1D, any of a variety of devices and processes for reconstructing 3D models of organs or registering endoscopy data as appropriate to the requirements of a specific application can be utilized in accordance with embodiments of the invention. Below, validation experiments based on embodiments of the invention are discussed.

Validation Experiments
Data Collection and Calibration Procedure

Researchers performed validations experiments using standard clinical equipment to collect data: a 30° rigid cystoscope (Stryker), xenon light source (Stryker X-7000), and endoscopic camera (Stryker HD-1488) with a resolution of 1280×720 pixels and a frame rate of 30 Hz. Additionally, a data acquisition procedure was developed that posed minimum disruption to the standard clinical workflow, and was an important precursor to obtaining high-quality images to seed the reconstruction. Three minor modifications to the standard cystoscopy workflow were necessary for the method pipeline to be applied.

First, to ensure that the camera parameters remained constant throughout the entire length of video, it was important that the endoscopist (1) adjust the focus of the cystoscope only once after the cystoscope entered the bladder and (2) avoid introducing motion between the camera head and the cystoscope during the procedure, which causes the intrinsic parameters to change. That is, while the cystoscope is often rotated with respect to the camera to image during the cystoscopy in standard practice, in this acquisition protocol, the cystoscope and camera were consistently rotated together.

Second, to extract the highest quality images, the video was captured under the following conditions: (1) The entire cystoscopy procedure was recorded at the maximum camera resolution. (2) Once the cystoscope was inserted, the bladder was distended with saline to achieve a medium of uniform optical density through which to image the surface of the bladder and to achieve a near-rigid shape throughout imaging. The flow of saline was adjusted to remove debris from the bladder and to eliminate bubbles or turbulent particles that could obstruct images of the bladder wall. (3) The cystoscope was kept within several centimeters of the bladder wall and slowly moved (at an approximate rate of 1.25 cm/s) during the imaging procedure to minimize motion blur. (4) To minimize drift in the reconstruction method, the physician was asked to return to areas of the bladder previously imaged (i.e., to create "loops"). This was accomplished by imaging the posterior wall by first rastering with the fast-axis from neck to dome and then rastering in the orthogonal direction with the fast-axis from the left to right lateral wall. The same procedure was then repeated for the anterior wall. In standard practice, the bladder is also distended and a thorough visualization of the bladder wall is conducted; however, less care is taken to achieve the highest quality image at all locations of the bladder (since the physician has a general idea what he expects to see) and there is no need to systematically create loops in the scanning pattern.

Finally, following surveillance of the bladder wall, the physician removed the cystoscope lens from the bladder and performed a calibration procedure to determine the distortion and intrinsic camera parameters. Without adjusting any camera parameters, images of a calibration target were collected at several angles and distances from the cystoscope. Both the careful scanning and the calibration procedure add a few minutes (3-5 min) to the standard cystoscopy procedure length, but the lengthening of the procedure is minor with respect to the entire endoscopic resection (typically 30 min-2 hours).

Phantom Data Collection

To validate the reconstruction method, a phantom with a well-characterized shape and surface appearance was created. Datasets collected with the phantom enabled direct comparison of results with a ground truth reconstruction. The phantom consisted of a 3D-printed, 75-mm inner diameter semi-cylinder with a length of 100 mm onto which a high-resolution bladder image was color printed and affixed to the interior ("original semi-cylinder phantom"). A second phantom ("modified semi-cylinder phantom") was created with small modifications to its shape and texture: specifically a few ink marks were added to the printed texture and a small cylindrical object was placed below the printed paper to cause a change in the shape of the object mimicking a projecting lesion. Hence, these modifications were meant to mimic the types of changes that could occur between cystoscopy sessions of the same organ in a patient with bladder cancer. The phantoms were imaged akin to the procedure described for the in vivo bladder examples: video data were collected by scanning the scope close to phantom wall in a raster pattern with the fast-axis first along the length of the cylinder and then along the circumference of the semi-cylinder. Notably, these data were collected in air rather than saline, and lighting was adjusted to minimize specular reflections.

Human Data Collection

Human bladder data were obtained from patients undergoing rigid cystoscopies in the operating room as part of their standard of care. This protocol was approved by the Stanford University Institutional Review Board and the Veterans Affairs Palo Alto Health Care System Research and Development Committee.

Results and Discussion
Reconstruction of Tissue-Mimicking Phantom Datasets

Figure 2:
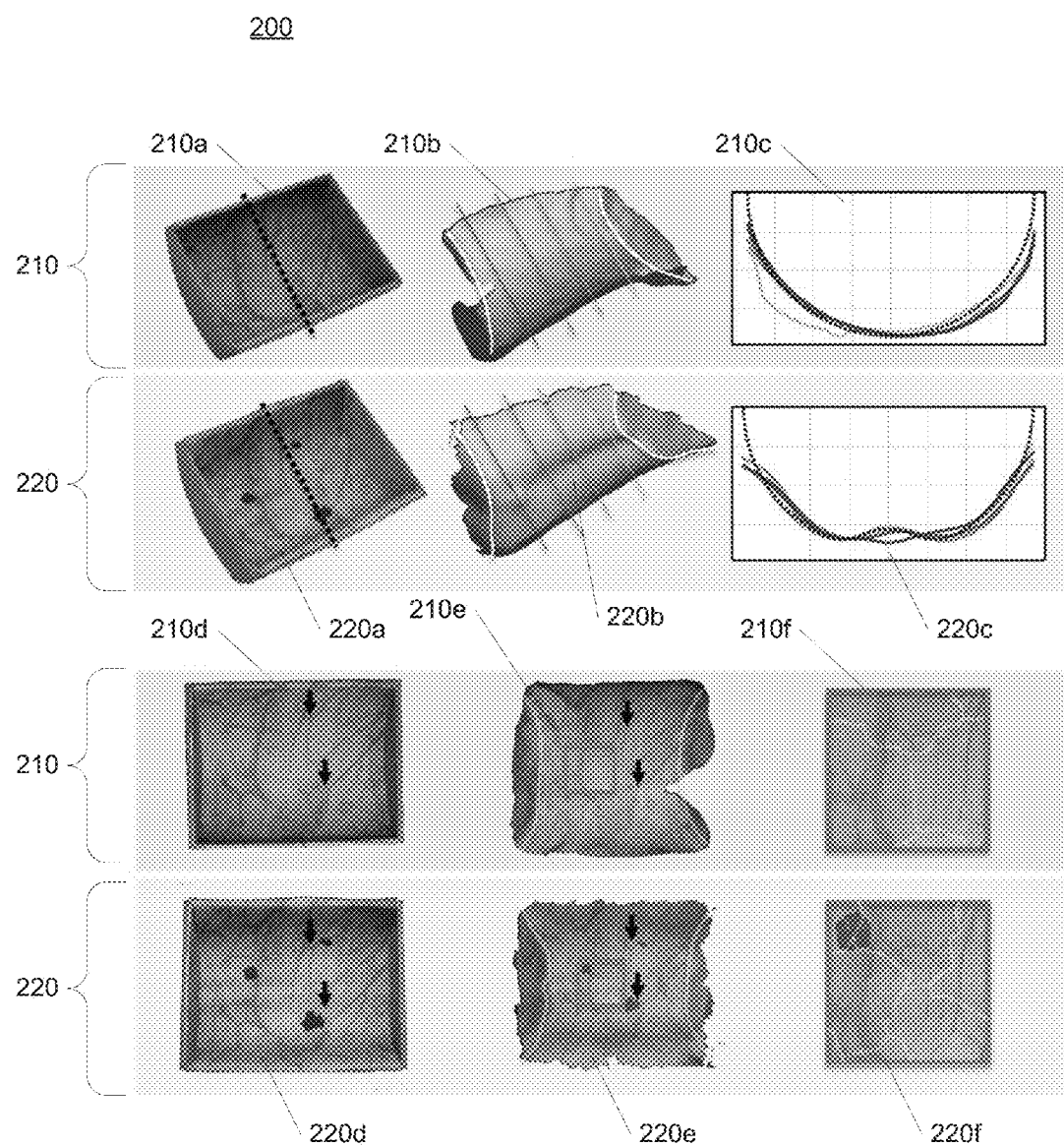
FIG. 2 is a diagram showing results of an implementation of a reconstruction method in accordance with an embodiment of the invention.

The reconstruction pipeline was tested on datasets collected from a semi-cylinder phantom ("original") and a modified version thereof that contained small changes to the shape and appearance of the phantom ("modified"). As shown in FIG. 2, results 210 and 220 from the original and modified datasets, respectively, validate the performance of the 3D reconstruction process because the shapes of the phantoms roughly mimic the appearance, size and curvature of the bladder and, as they are known a priori, the ground truth shape and texture (pattern) information can be used to qualitatively evaluate the reconstruction results.

Phantom reconstruction results 200 are shown in FIG. 2. Standard digital camera images 210*a*/220*a* of the phantoms highlighting their shapes are compared with the untextured reconstructed mesh 210*b*/220*b*. Cross-sections 210*c*/220*c* of the expected mesh (dotted line) and measured mesh (various solid lines with representing different cross sections) are compared. Each box of the grid represents 1 cm². Standard digital camera images 210d/220d of the phantoms highlighting their surface appearance are compared with the reconstructed textured phantoms 210e/220e viewed from approximately the same camera angles. Arrows are added to highlight similar features between the original 210d/220d and reconstructed 210e/220e images. The white lines added in 210b/220b and 210e/220e accentuate the sides of the phantoms from the cylindrical portion. Boxes in 210e/220e indicate regions of texture shown in greater detail in 210f/220f, and emphasize the seamlessness between regions composed of different images. The dotted white lines in 210f/220f indicate boundaries between mesh faces that are composed of different original images.

After reconstruction, the average reprojection errors, which describe the relationship between features extracted from 2D images and the projection of the calculated 3D representations into the image, were less than one pixel (0.80 and 0.79 pixels for original and modified phantoms, respectively), suggesting a high-quality reconstruction. A comparison between the ground-truth phantom shape 210a/220a and the reconstruction mesh 210b/220b shows that the shape of the phantom is reconstructed accurately in the structure-from-motion (SfM) and mesh-generation operations of the process. Specifically, the original semi-cylinder phantom reconstruction takes on a semi-circular shape, as expected. The reconstructions of the modified and original semi-cylinder phantoms bear great resemblance, save for a small ridge along the bottom of the semi-cylinder in the former that corresponds to the actual cylindrical protrusion that was physically placed below the textured paper to yield the modified form when the phantom was created.

To give a better sense of the comparison between the reconstructions and ground truth (derived from the known 3D shape of the phantom), their cross-sections 210c/220c are compared. Each cross-section along the length of the reconstruction was aligned with the minimum y-value and scaled to match the width of the ground-truth reconstruction, as the SfM operation does not recover the metric scale of the object. The general shape of the object is captured in both reconstructions with a few notable exceptions: (1) as expected, one of the cross-sections of the modified phantom does not exhibit the ridged feature (darkest red line) because the ridge was only placed part way along the length of the phantom and (2) the original phantom also has a cross-section that deviates from the semi-circular appearance (lightest red line) due to an inaccuracy in the reconstructed shape in a local region. FIG. 2 shows a comparison between the texture captured by a single image 210d/220d from a standard digital camera with the reconstructed texture 210e/220e observed from roughly the same camera position and orientation. The similarity between the two images validates the accuracy of the reconstruction method, as the reconstructed texture comprises approximately 50 images. Although a single digital camera can capture the entire semi-cylinder, this may be difficult with a cystoscope because a single image of the entire phantom captured with the cystoscope would be too dark or noisy. Not only are the original and reconstructed textures qualitatively very similar, but the reconstructed texture retains good contrast and sharpness of vasculature. Notably, the seams between images are nearly imperceptible over the majority of the bladder, as evidenced by the continuity of vessels across the boundaries of different images 210f/220f. This observation validates the high accuracy of the camera positions calculated in the structure-from-motion pipeline. Poor camera positions would cause inaccurate projections of images onto the mesh, leading to discontinuities at the boundaries of different images in the textured appearance.

Reconstruction of Clinical Datasets

To demonstrate the ability of the method to work with standard clinical data, researchers collected cystoscopy videos from 21 patients undergoing a rigid cystoscopy prior to endoscopic resection of suspicious tumors in the operating room. The average length of the cystoscopy videos used for reconstruction was 6.0±2.0 minutes, which corresponded to 2700±900 frames given a frame rate of 30 fps with a temporal downsampling of four.

Figure 3:
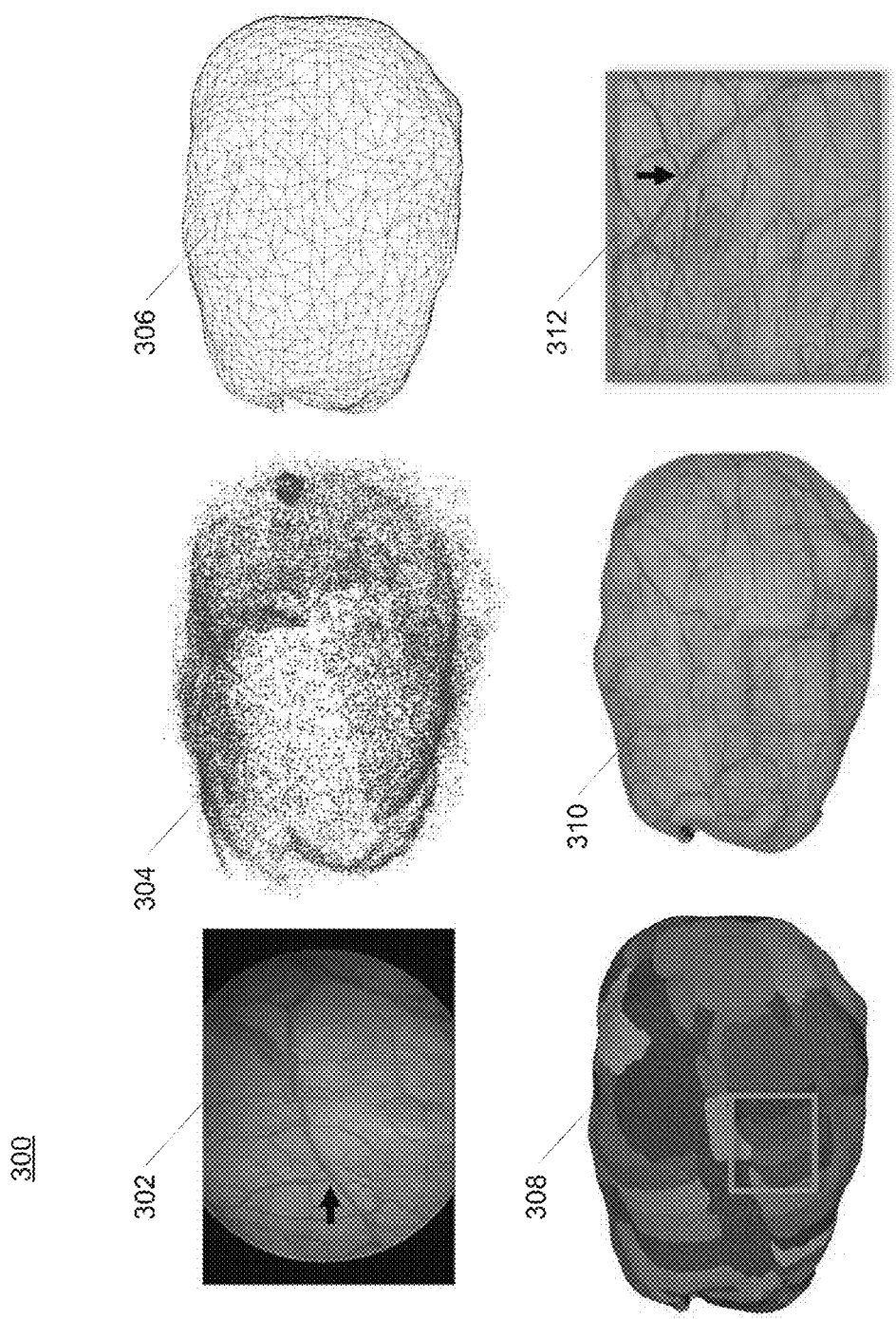
FIG. 3 is a diagram showing additional results of an implementation of a reconstruction method in accordance with an embodiment of the invention.

FIG. 3 shows the output 300 from certain processes within the reconstruction method from a representative clinical dataset of human bladder: a representative, original WLC image 302; point cloud 304 from the structure-from-motion operation before outlier removal; mesh 306 from the mesh-generation operation; labeled texture 308 (faces with the same color are labeled with the same input image) and textured mesh 310/312 from texture-generation operation. The boxes of 308/310 show a similar region between the two subfigures indicating clear continuity of vessels despite the use of multiple input images to construct this region. The box is approximately the size of a single WLC image. Arrows in 302 and 312 indicate similar regions of the bladder.

The cystoscopy video 302 used in this example was 7:48 minutes in duration and required 151:00 minutes to perform the reconstruction. It is evident that the point cloud 304 generated from the structure-from-motion (SfM) operation approximates an ovoid shape similar to a bladder. The sparse point-cloud reconstruction determined camera poses for 75% of the input images (excluding images when the cystoscope is entering or leaving the bladder through the urethra), which is an indicator of the robustness of the method. The majority of keyframes (video frames selected to be used in the reconstruction) where camera poses could not be computed were in concentrated temporal segments of the video as opposed to sparsely sampled throughout the video. This pattern suggests the challenge with the reconstruction was due to the video quality, rather than the method itself. Specifically, a few sections of the video where quality is poor due to dark images, fast motion, or obstruction with biopsy forceps do not have computed camera poses. Nonetheless the average reprojection error was 0.78 pixels, which suggests a high quality reconstruction.

As expected, the mesh-generation operation preserves the ovoid shape of the bladder as seen in mesh 306, and the texture-reconstruction operation generates a high quality texture from several preprocessed images, as seen in texture 308 and textured mesh 310/312. Texture reconstruction recovered a texture for 92% of the faces of the bladder mesh. This percentage provides an estimate of what surface area of the bladder wall was reconstructed. The inability to recover texture for 8% of the faces is likely due to the lack of input for certain faces that were never captured with the cystoscope (as it is difficult to image the bladder neck with a rigid cystoscope), making texture recovery impossible for these faces. The missing region may also be due to the lack of loop closure between the edges of the region or imprecision in the reconstructed shape of the bladder.

Figure 4:
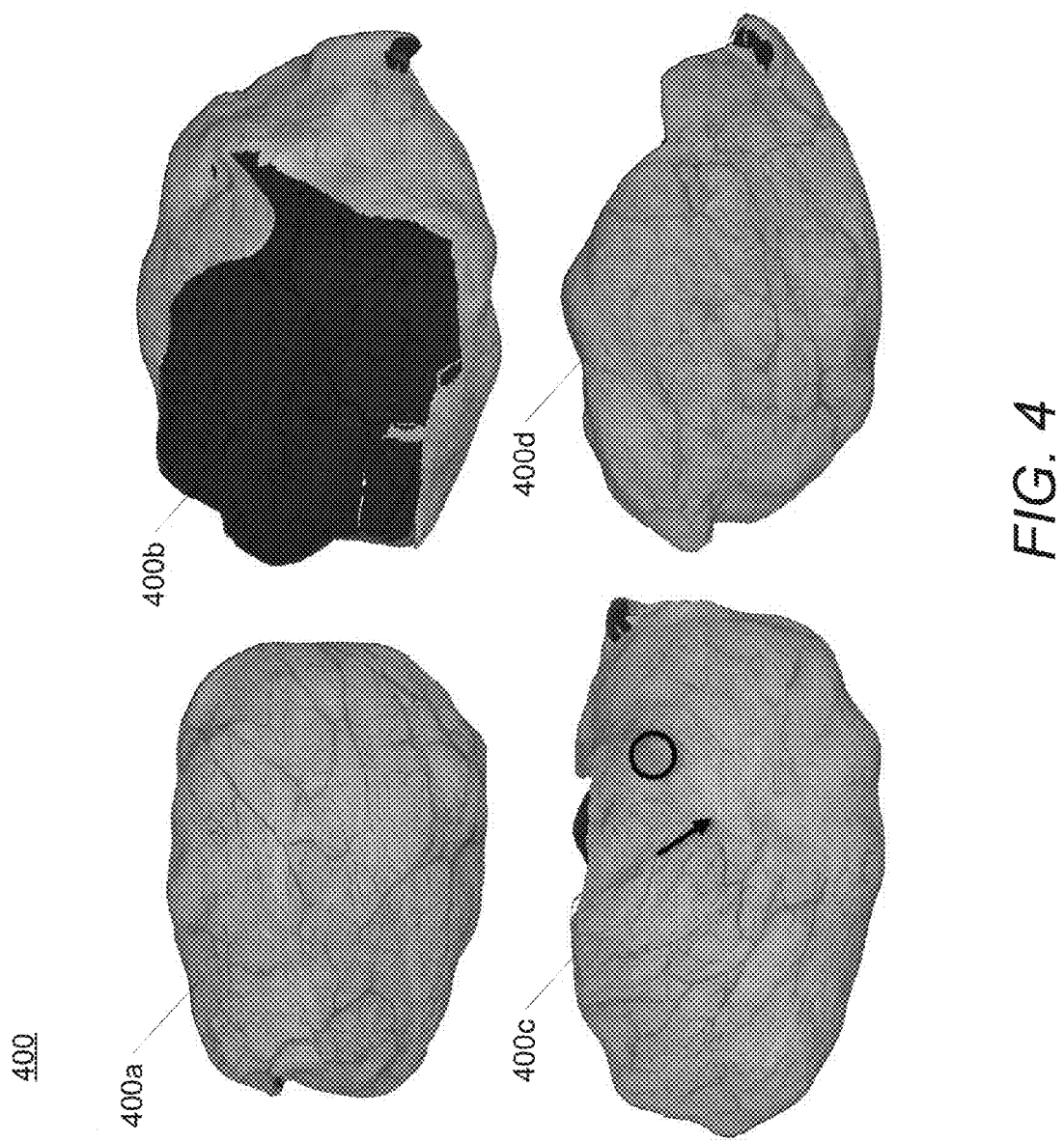
FIG. 4 is a diagram showing yet additional results of an implementation of a reconstruction method in accordance with an embodiment of the invention.

FIG. 4 shows a reconstruction 400 from a clinical dataset of a human bladder. Sub-figures show views from the anterior 400a, posterior 400b, left lateral 400c, and right lateral 400d walls. A circle and arrow at 400c show regions of a papillary tumor and scarring, respectively. Regions that appear dark represent the interior of the bladder.

As shown in FIG. 4, the reconstructed texture 400 maintains good continuity throughout the majority of the reconstruction, indicating that accurate camera poses were calculated. The texture 400 also has high vascular contrast with no apparent lighting artifacts. These characteristics of the texture are due to an image preprocessing operation utilized in accordance with an embodiment of the invention, which normalizes the image based on its estimated lighting variation and masks noisy, dark regions. Additionally, the texture reconstruction operation blends adjacent patches, which also contributes to the smoothness of the texture 400. Important features such as scarring and the 2-3-mm papillary tumor noted in the patient's medical record are visible in the reconstruction (black circle at texture view 400c).

TABLE 1

Process run-time of reconstruction pipeline for all successfully reconstructed datasets and example dataset from FIG. 4. Times given in MM:SS format.

|  | Average (n = 14) | Example |
|---|---|---|
| Num. images | 2445 ± 732 | 3498 |
| Num. reconstructed images | 1609 ± 695 | 2378 |
| Image preprocessing |  |  |
| for SfM images | 05:47 ± 01:54 | 09:31 |
| for TEX images | 12:25 ± 03:29 | 13:23 |
| SfM |  |  |
| Feature extraction | 02:29 ± 01:03 | 04:29 |
| Two-view reconstruction | 29:05 ± 09:58 | 58:52 |
| Three-view reconstruction | 09:09 ± 07:37 | 07:31 |
| Model generation | 23:06 ± 16:10 | 19:35 |
| Mesh generation | 00:13 ± 00:04 | 00:17 |
| Texture reconstruction | 19:04 ± 17:05 | 36:55 |
| TOTAL | 91:10 ± 40:22 | 151:00 |

Reconstruction Method Run-Time

Table 1 summarizes the run-time of the reconstruction pipeline for the human bladder example shown in FIG. 3 and the average statistics for all successfully reconstructed human bladder datasets. The average reconstruction for the dataset required 91:10 minutes; reconstruction times were roughly proportional to the number of images input into the SfM and texture-reconstruction operations, with the longest reconstruction times required for the SfM operation. Additional processes that depend proportionally on the number of input images include image preprocessing, descriptor extraction operations, and image matching with vocabulary tree, among others.

Although the current method requires significant time for processing, the current timing is still advantageous for the current clinical workflow: it is not imperative to use these reconstructions in interactive-time as they merely need to serve as visual medical records that can be reviewed before the patient's next procedure. Additionally, the processing time of the SfM method or texture reconstruction code could be further reduced by taking advantage of the temporally-ordered images in the video sequence.

Although the above discussion includes examples related to cystoscopies of the bladder, the method is applicable to other endoscopy applications for which the organ is semi-rigid and the space between endoscope and tissue contains a medium of uniform optical density (e.g., water, saline, or air). The method may also be applied to various types of camera systems and endoscopes.

The method according to some embodiments of the invention may also be employed as a realtime system, in which the reconstruction could be used to alert an endoscope operator to locations that were not imaged or that do not have sufficient data quality. In addition, the 3D model may optionally be utilized to add annotations, providing the user with more spatial awareness to add annotations, as well as ease of comparison of annotations (between models for different patients or of the same patient at different scanning sessions). The 3D reconstruction may also be used to extract quantitative information about the organ, including information regarding variation in texture appearance, vascular density, lesion size and coverage area.

Methods for co-registration of two 3D reconstructions in accordance with a number of embodiments of the invention are discussed further below.

Example Application of 3D Reconstruction: Co-Registration

The 3D reconstructions according to a number of embodiments of the invention can be used in a host of applications: from validating the entire organ that was imaged, performing a virtual endoscopy to review the procedure, or comparing the appearance of the organ over time. In this section, implementation of a co-registration method according to several embodiments of the invention demonstrates the last example, aligning two 3D reconstructions that embody minor differences in shape and appearance.

Method for Co-Registration

Figure 5A:
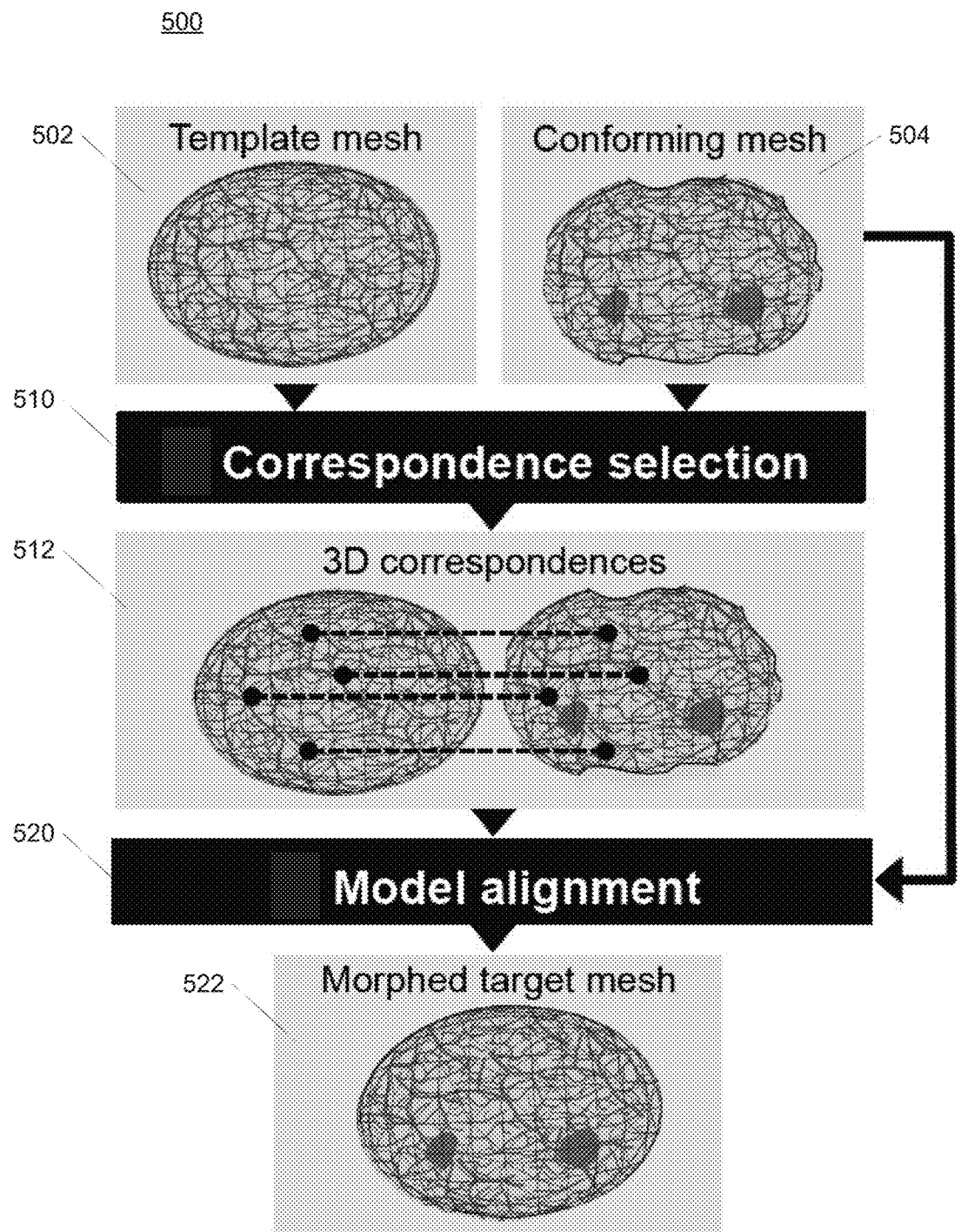
FIG. 5A is a diagram illustrating a process for co-registration of two 3D organ models in accordance with an embodiment of the invention.

In many embodiments of the invention, a co-registration method 500 as shown in FIG. 5A transforms one organ model ("conforming mesh") 504 into the shape of another ("template mesh") 502 so the appearance of the organ at identical locations on the organ wall can be compared. This method pipeline may consist of two major operations: correspondence detection 510 and model alignment 520.

Correspondence Detection

Given the nature of this clinical application, the robustness of standard features may be tenuous. Thus, in many embodiments of the invention, appearance-based correspondences 512 between two organs may be identified by viewing the two 3D models simultaneously. The identification of correspondences may be performed manually or via one of various automatic processes, in accordance with several embodiments of the invention. These correspondences 512 may include anatomical regions, prominent vessels, or scars. In certain embodiments of the invention, at least three non-colinear correspondences are required. The correspondences 512 may be represented as $X_t \leftrightarrow X_c$, a pair of 3D points, with one from the template mesh 502 ($X_t$) and one from the conforming mesh 504 ($X_c$), that represent a similar location in each of the meshes.

Model Alignment

According to several embodiments of the invention, the model alignment 520 is performed by estimating a rigid transformation between the two meshes 502/504 and manually-selected correspondences 512, followed by an iterative-deformation process to progressively morph the conforming mesh 504 into the shape of template mesh 502. In some embodiments of the invention, a rigid transformation is estimated using Procrustes analysis by minimizing $\|X_t - TX_c^0\|_2$, where $\|\cdot\|$ is an $l^2$ norm. The rigid transformation may be estimated as a similarity transformation where $T = [sR\ t]$ with a scalar constant s, rotation matrix R, and translation vector t. According to some embodiments of the invention, the iterative-deformation begins by applying the similarity transform to the initial set of vertices of the conforming mesh ($v_c^0$): $v_c^1 = Tv_c^0$ and the appearance-based correspondence points 512 in the conforming mesh $X_c^1 = TX_c^0$. For a subsequent iteration, i, a Euclidean-distance-based set of correspondences may be computed automatically by selecting a random set of vertices in the template mesh ($v_0$) and finding the nearest vertex in the transformed conforming mesh ($v_t^{i-1}$). According to many embodiments of the invention, the ratio of the number of distance-based correspondences to appearance-based correspondences dictates the relative importance of the initial appearance-based correspondences (i.e., a very large ratio will de-emphasize the appearance-based correspondences for a smoother deformation map). Based on the selected distance-based correspondences ($v_t \leftrightarrow v_c^{i-1}$) as well as the transformed appearance-based correspondences ($X_t \leftrightarrow X_c^{i-1}$), a thin-plate spline warping ($f_{tps}^i$) may be computed. In some embodiments of the invention, the thin-plate spline warping is determined by minimizing a linear combination of the Euclidean distance between the appearance-based correspondences, the Euclidean distance between the distance-based correspondences, and smoothness of the thin-plate-spline dictated by the second derivative of the thin-plane spline. According to several embodiments of the invention, the vertices of the conforming mesh are updated on each iteration as $v_c^i = f_{tps}^i(v_c^{i-1})$, and the approach continues until convergence (i.e., the shape of the conforming organ approximates the shape of the template organ). This is reminiscent of a non-rigid iterative closest point procedure. The output of this operation is an updated set of vertex positions for the conforming mesh 504 that converts the conforming mesh 504 into a shape 522 that approximates the template mesh 502. A flow chart for the co-registration method according to some embodiments of the invention is described below.

Co-Registration Process

Figure 5B:
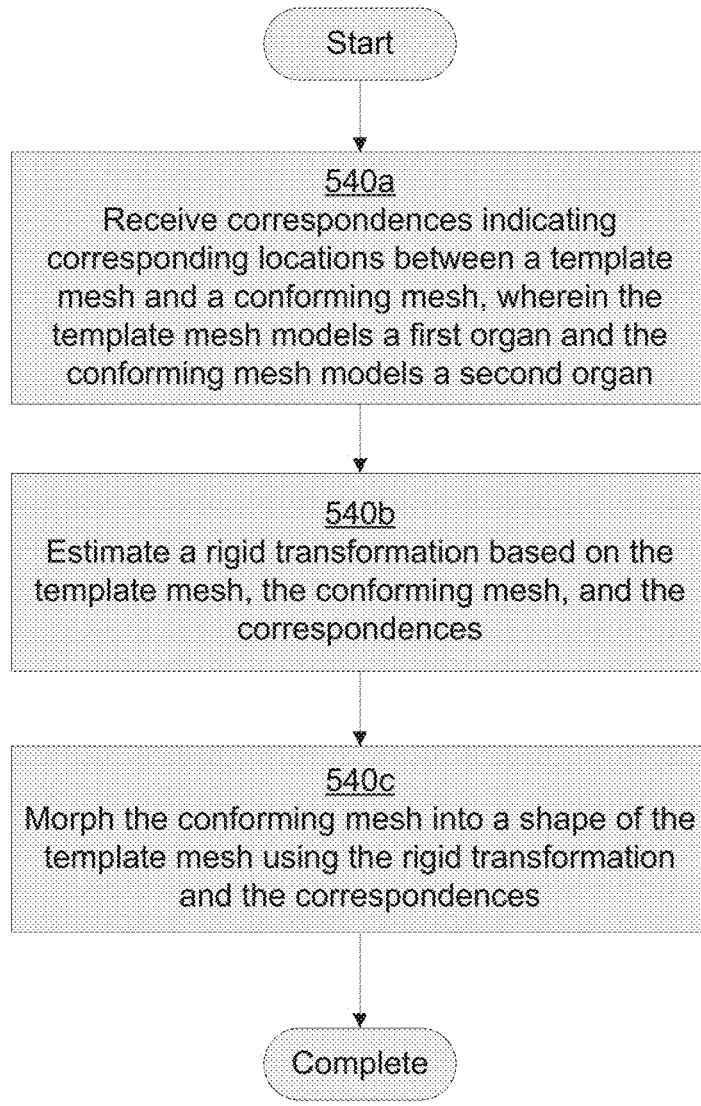
FIG. 5B is a flow chart illustrating a method for transforming one organ model into a shape of another organ model in accordance with an embodiment of the invention.

A co-registration method 540 for transforming one organ model into a shape of another organ model, according to many embodiments of the invention, is shown in FIG. 5B. The co-registration method 540 may include receiving (540a) correspondences that indicate corresponding locations between a template mesh and a conforming mesh. In many embodiments of the invention, the template mesh models a first organ and the conforming mesh models a second organ. Optionally, the second organ may be a different version of the first organ. For example, the first organ may be a patient's bladder from a certain year, and the second organ may be the same patient's bladder examined the year after.

In several embodiments of the invention, co-registration method 540 further includes estimating (540b) a rigid transformation based on the template mesh, the conforming mesh, and the correspondences. According to a number of embodiments of the invention, the conforming mesh may be morphed (540c) into a shape of the template mesh using the rigid transformation and the correspondences.

Although methods of co-registration are described above with respect to FIGS. 5A-5B, any of a variety of methods for transforming one organ model into the shape of another as appropriate to the requirements of a specific application can be utilized in accordance with embodiments of the invention. Below, testing of the results of a co-registration method in accordance with an embodiment of the invention are discussed.

Implementation of Co-Registration Using Independent Phantom Reconstructions

Figure 6:
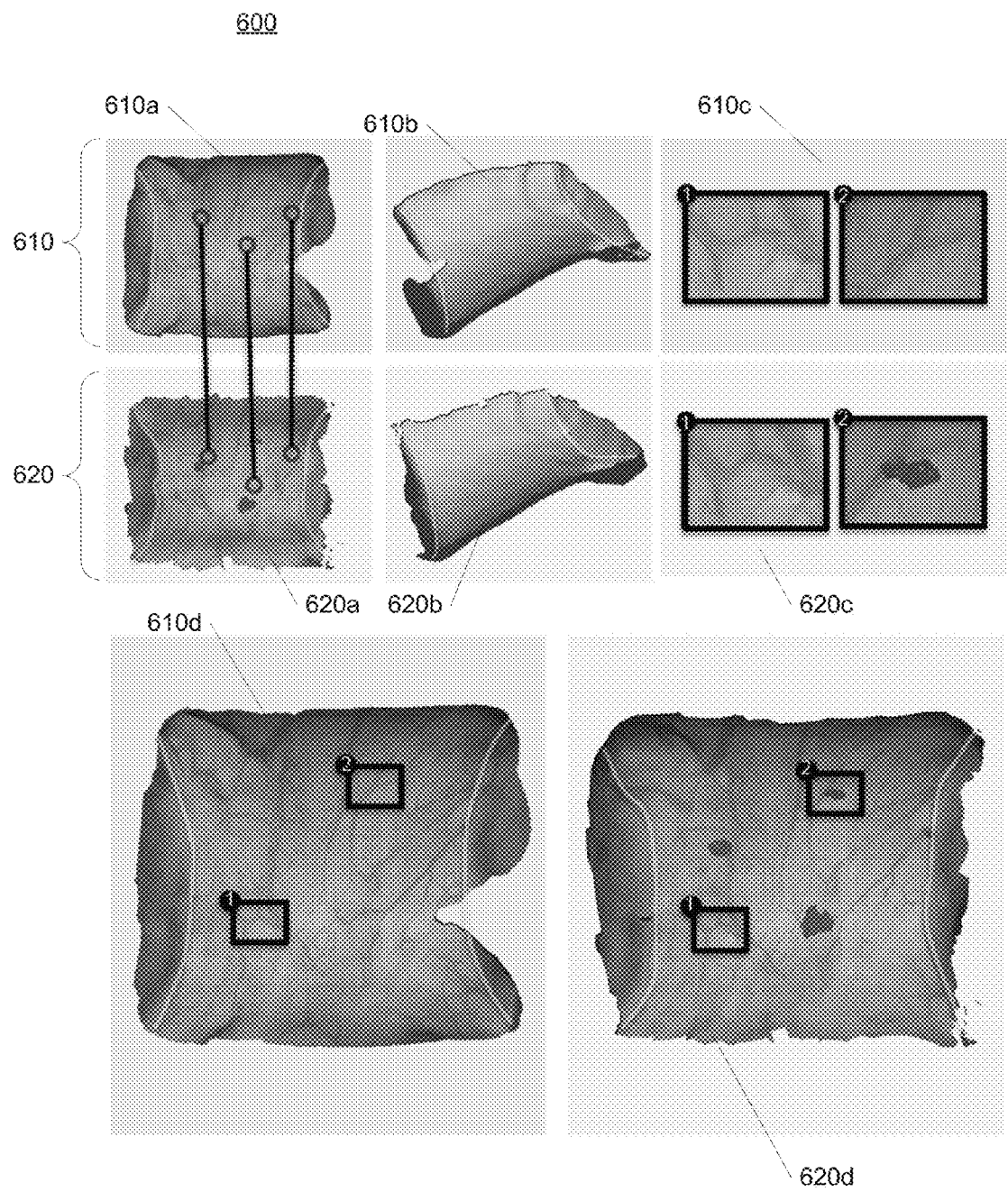
FIG. 6 is a diagram showing results of an implementation of a co-registration method in accordance with an embodiment of the invention.

Tests were performed with respect to a co-registration pipeline on the two semi-cylinder phantom datasets 610/620 (results 600 shown in FIG. 6) whose reconstructions were performed using a reconstruction pipeline similar to the pipeline described above. Shown in FIG. 6 is the co-registration of the two phantom reconstructions: original semi-cylindrical phantom 610 as the template mesh and modified semi-cylindrical phantom 620 as the conforming mesh; representative extracted interest point correspondences at 610a/620a before co-registration; and mesh appearance 610b/620b after deformable registration (FIG. 2 shows this mesh as 210b/220b before deformation). Black boxes show examples of identical mesh locations 610c/620c between the two reconstructions after morphing, with the complete 3D reconstruction shown at 610d/620d. White lines have been added at 610b/620b and 610d/620d to accentuate the sides of the phantoms from the cylindrical portion.

Twelve interest point correspondences were manually extracted across the two meshes 610a/620a. Using these interest-point correspondences, the meshes were coarsely aligned with a similarity transformation and then non-rigidly co-registered with a thin plate spline warp, shown at 610b/620b. Despite some discrepancies in the shape, the similarity-based registration provides a good approximation of registration of the two meshes.

A comparison between the co-registered models 610c/d and 620c/d is shown. Two example regions highlighted as black boxes are extracted from the same region of the co-registered models. The similarity in appearance of similarly numbered black boxes between each of the models demonstrates the high degree of co-registration. The co-registration method thus provides a useful comparison between two models, showing similarities and changes in the bladder appearance (i.e., appearance of blotches in model 2).

Unlike the reconstruction pipeline, which requires a few hours for processing, the co-registration pipeline (excluding manual feature extraction) can be done in interactive time. The efficiency of this method may allow for co-registration to be an interactive experience for a physician (e.g., models can remain deformable and the co-registration can be updated each time new correspondences are added in order to obtain a high-quality co-registration). A physician might use this result, for example, to quickly compare the current appearance of a bladder wall computed with a recent cystoscopy, with a reconstruction from an older cystoscopy to better understand if, where and how cancer is progressing. In some embodiments of the invention, an automated method may be used to register two bladder models, which would more efficiently fit into the workflow of the physician.

Methods for registering secondary-endoscopy data to a 3D reconstruction from primary-endoscopy data, in accordance with a number of embodiments of the invention, are discussed further below.

Method for Registration of Secondary-Endoscopy Data to Primary-Endoscopy Data

A method, according to some embodiments of the invention, has been described herein to register secondary-endoscopy data to primary-endoscopy data. The method may be used, for example, to register OCT-based daughter-endoscopy data to a 3D reconstruction created from mother data generated with a monoscopic WLC. According to several embodiments of the invention, the secondary-endoscopy registration method can be applied to primary-endoscopy video data, individual images, other datasets generated by the primary endoscope. In addition, the secondary-endoscopy data may comprise a volume, a 2D image, a 1D image, and/or a single measurement.

As the secondary endoscope, a rapid-scanning, forward-viewing OCT daughter endoscope, such as but not limited to that described in K. L. Lurie, A. A. Gurjarpadhye, E. J. Seibel, and A. K. Ellerbee, "Rapid scanning catheterscope for expanded forward-view volumetric imaging with optical coherence tomography," Opt Lett 40, 3165-3168 (2015), may be used. In studies, researchers further reduced the outer diameter and rigid length of this previously published endoscope to permit the technique to be extended to the clinic. The modified endoscope presented here may be capable of being inserted into the working channels of flexible cystoscopes, which are the standard tools used for bladder cancer surveillance in the clinic.

Using the modified OCT endoscope and a commercial WLC, the qualitative and quantitative performance of the registration method was demonstrated with a custom bladder phantom and intraoperative cystoscopy data. The registration accuracy was then validated by directly comparing the appearance of the 3D reconstruction with the co-registered OCT data. This validation process provided clear evidence that the OCT data were actually registered to the correct location on the 3D reconstruction, and that the method is superior to other techniques that validate the registration using position sensors as proxies. Overall, the technique and validation strategy presented is poised to augment the current standard of care for organ and cancer monitoring.

Figure 7A:
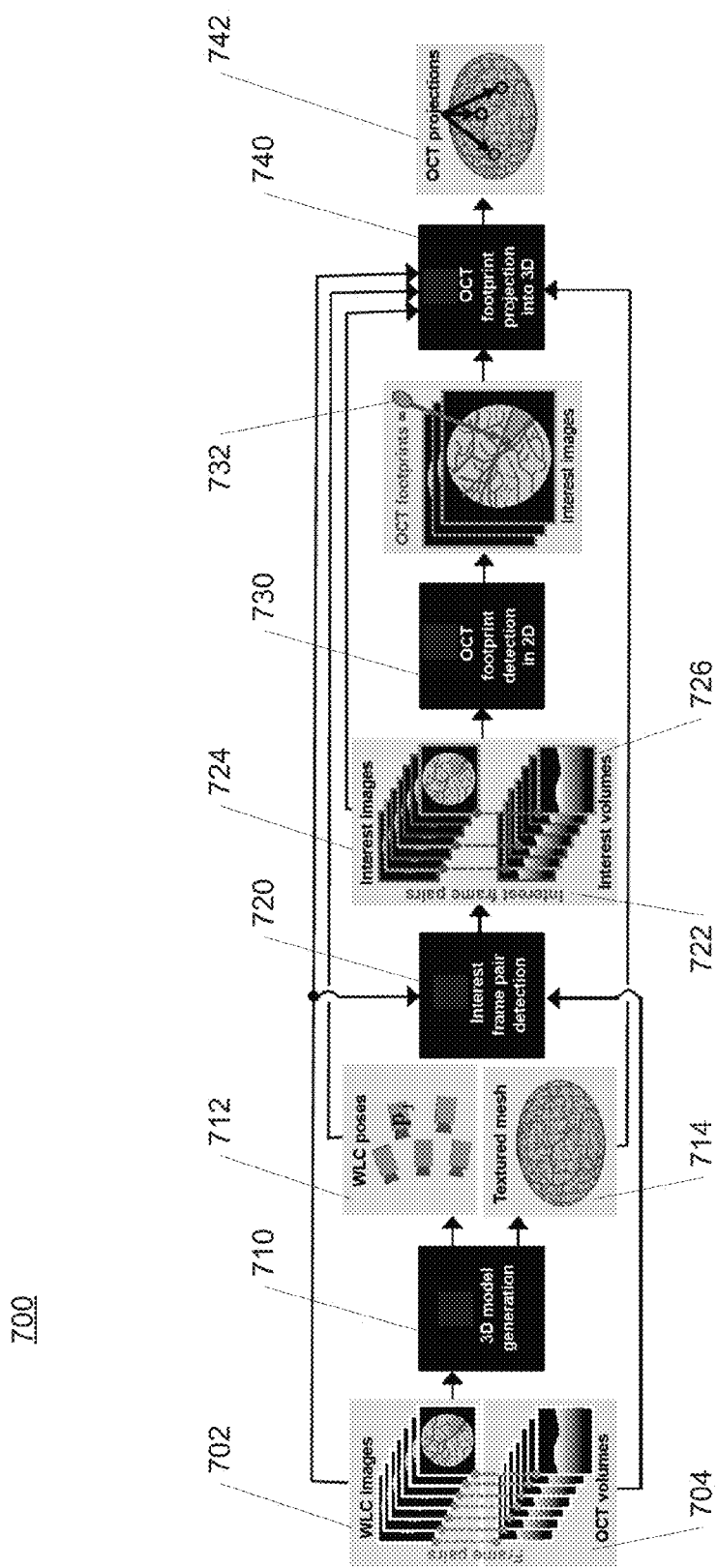
FIG. 7A is a diagram illustrating a process for registering secondary-endoscopy data to a primary 3D reconstruction in accordance with an embodiment of the invention.

According to a number of embodiments of the invention, a method 700 for registering secondary-endoscopy data to a 3D reconstruction of primary-endoscopy data comprises operations 710, 720, 730 and 740, as shown in FIG. 7A and described generally below.

(A) 3D Model Generation: As shown in FIG. 7A, according to many embodiments of the invention, a video 702 from a primary-endoscopy using a first modality, such as WLE (or WLC in the case of white light cystoscopy), is transformed (710) into a 3D reconstruction including camera poses 712 and a textured mesh 714, that captures the shape and appearance of the organ.

(B) Interest Frame Pair Identification: In several embodiments of the invention, frame pairs may be defined to comprise simultaneously acquired data 704 from secondary data, such as OCT volumes, and images 702 from primary data, such as WLC images. Those frame pairs that contain a high-quality volume capture of the organ may be labeled (720) as interest frame pairs 22.

(C) Footprint Detection: According to a number of embodiments of the invention, positions are detected (730) in the interest images 724 (the images in the interest frame pairs) from which the interest volumes 726 (the volumes in the interest frame pairs) were captured. Each projection of the volume onto the 2D image plane of the interest image may be denoted as a footprint 732.

(D) Footprint Projection: In some embodiments of the invention, the footprint 732 is projected (740) onto the 3D bladder reconstruction to find the footprint projection 742 (3D position of the footprint), given the known camera poses 712 associated with the images 702 and the position of the 2D footprint 732.

Operations within the registration method 700 in accordance with a number of embodiments of the invention is described in further detail below.

3D Model Generation

According to several embodiments of the invention, a 3D reconstruction of the organ is generated (710). This reconstruction may be based exclusively on the primary data 702, to which the secondary data 704 can later be co-registered. In a number of embodiments of the invention, the 3D model may be reconstructed using all or part of the reconstruction methods as described above in relation to FIGS. 1A-1C (or similar methods).

According to some embodiments of the invention, images from a primary-endoscopy video are processed to (1) calibrate the camera to determine intrinsic camera parameters and remove distortions endemic to endoscopic optics, and (2) adjust the color to enable robust feature extraction and minimize lighting artifacts. These processed images may then be inserted into a structure-from-motion (SfM) process based on a sequential SfM pipeline. In certain embodiments of the invention, images selected for further processing are denoted as keyframes. Keyframes may be selectively matched with other keyframes on the basis of feature descriptors extracted from interest points (positions of image features to be matched) common to the two keyframes. The result is an initial sparse point cloud, containing 3D points that represent the surface of the organ, and poses ($p_j$) that represent the position and orientation of the endoscope corresponding with each keyframe. In many embodiments of the invention, the surface of the organ is represented using a triangle mesh, after which the organ appearance is finalized by using a texture-reconstruction method to assign, blend, and overlay selected image patches from the keyframes onto the organ mesh. The organ may be assumed to be rigid during imaging in certain cases, such as a cystoscopy during which the bladder is distended with fluid during imaging.

Although methods of 3D model generation are described above with respect to FIG. 7A, any of a variety of methods for generating 3D reconstructions of an organ as appropriate to the requirements of a specific application can be utilized in accordance with embodiments of the invention. Methods for interest frame pair identification in accordance with a number of embodiments of the invention are discussed further below.

Interest Frame Pair Identification

Although secondary data such as OCT volumes are captured continuously, only certain volumes, such as those where an OCT endoscope is placed near a bladder wall, are likely to contain meaningful data. The aim of this operation is to identify (720) interest frame pairs 722, or frame pairs in which the secondary data are meaningful. Various aspects of the standard imaging protocol may facilitate interest frame pair identification. Two examples are: (1) deployment of the secondary endoscope into the working channel of the primary endoscope may render the secondary endoscope visible in the primary data images, and (2) the shallow depth of focus associated with certain types of imaging, such as the OCT modality, limits the data channel to producing high signal-to-noise-ratio (SNR) data only when the tissue is nearly in focus. As an example, high OCT backscatter intensity and thus SNR occurs when the tissue is nearly in contact with a bladder wall. Hence, in certain embodiments of the invention, interest frame pairs are characterized as those having both (1) a visible secondary endoscope in the primary image and (2) a high-SNR signal in the secondary volume.

In several embodiments of the invention, the interest frame pair identification process 720 may identify primary images that contain a visible secondary endoscope using a "blue-by-red" image calculated as $I_{B/R}(i,j) = \min(I_B(i,j)/I_R(i,j), 1)$. Here the relatively bluish color of the secondary endoscope, is contrasted with the reddish appearance of an organ. From this image an initial binary mask may be generated. $M_{scope}^{init}$, described by $$M_{scope}^{init} = \begin{cases} 1 & I_{B/R} > \text{threshold} \\ 0 & \text{otherwise} \end{cases},$$

where a typical value for the threshold is 1.4, according to certain embodiments of the invention. In several embodiments of the invention, the mask $M_{scope}^{init}$ is eroded to remove noise and anomalous regions (e.g., saturated areas due to debris) and dilated to produce the final binary-endoscope mask: $M_{scope}$. If the sum of the pixel intensities in $M_{scope}$ lies above a minimum threshold (e.g., 2% of image area), the image may be classified as endoscope-present.

In many embodiments of the invention, for images classified as endoscope-present, it is next evaluated whether the secondary volume has a high-SNR signal. As an example, voxels in an in-focus OCT volume will have an intensity that is considerably larger than the intensity of a background volume taken when there is no sample in front of the endoscope. A volume may thus be classified as high-intensity when its average exceeds a fixed threshold. In the case of the OCT modality, a threshold of 30 may be used, based on when OCT volumes are stored as the log-magnitude of the intensity at 8-bits. The detected interest frame pairs 722, according to a number of embodiments of the invention, thus comprise an endoscope-present primary image and a high-SNR secondary volume, and only these frame pairs may be considered for further processing.

Although methods of interest frame pair identification are described above with respect to FIG. 7A, any of a variety of methods for identifying frame pairs with meaningful data as appropriate to the requirements of a specific application can be utilized in accordance with embodiments of the invention. In addition, in some embodiments of the invention, detection of the secondary endoscope in the field of view of the primary endoscope may be achieved by an approach other than a colorimetric method. One approach is based on using the secondary endoscope's relatively fixed position within the field of view when imaging is being performed, to account for the position of the endoscope. In certain embodiments of the invention, high quality frames are detected using alternative secondary modalities, using a similar concept to that used for OCT (i.e., high SNR image or signal signifies interest frame). Methods for footprint detection in accordance with a number of embodiments of the invention are discussed further below.

Footprint Detection

The aim of footprint detection 730 is to localize the en face projection of the secondary volume, denoted as the footprint within the associated primary image. The footprint equivalently denotes the location on the organ surface from where the secondary data were collected and is derived by determining the transformation between the primary and secondary endoscopic coordinate systems. In certain embodiments of the invention, the following assumptions are made about the secondary endoscope to facilitate footprint detection: (1) it is visible in the primary image, (2) it is in contact with the tissue, and (3) it has a cylindrical shape. These can be reasonable assumptions because (1) the definition of an interest frame pair requires that the endoscope be visible in the primary image, (2) the endoscope is designed to produce in-focus images only when in contact (or just nearly in contact) with the tissue, and (3) the endoscope is generally designed to have a cylindrical shape. In certain embodiments of the invention, the endoscope may be assumed to embody other shapes, such as but not limited to cones. Other assumptions according to some embodiments of the invention are that the volume imaged by the secondary endoscope is cylindrical and concentrically located with the secondary endoscope. These can also be reasonable assumptions because the secondary endoscope scan pattern is typically programmed to be nearly circular, and the certain secondary endoscope system, such as OCT systems, are designed such that the optics, scan pattern, and housing are all approximately concentric. Finally, in several embodiments of the invention, the footprint detection is based on a specific color of the secondary endoscope, such as the blue color of an OCT endoscope. In other embodiments of the invention, other tool-segmentation methods, which rely on other color statistics, expected tool motion, or shape variations can be applied to endoscopes with a wider range of appearances.

Specifics regarding footprint detection 730 are described below.

Representation of the Endoscope with Single-View Geometry

Figure 8:
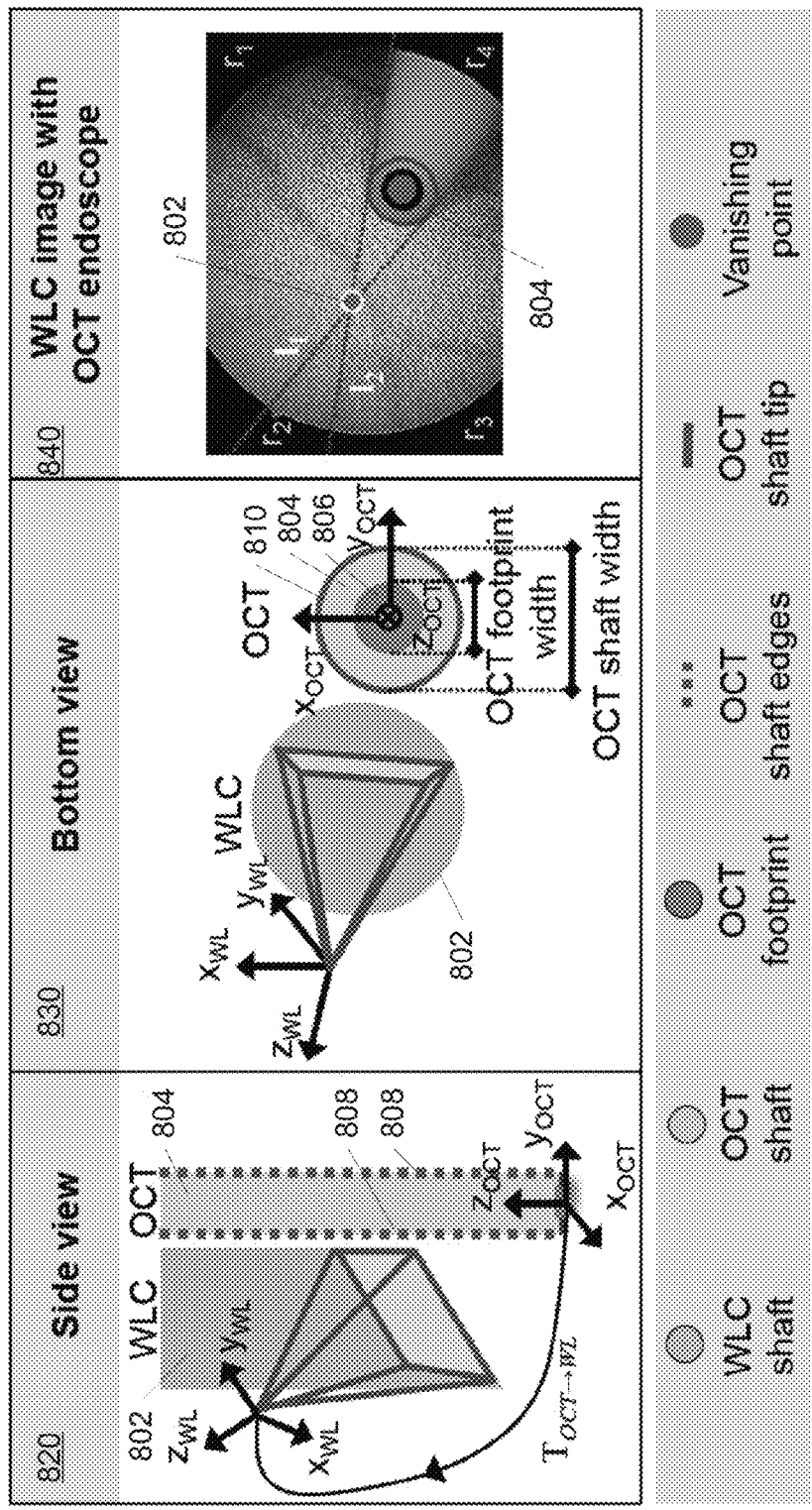
FIG. 8 is a diagram illustrating the relative positions of a primary endoscope, a secondary endoscope and a footprint, and their coordinate systems, in accordance with an embodiment of the invention.

In this description, the following convention is used to define the primary and secondary coordinate systems: the origin of the secondary coordinate system is centered at the distal end of the secondary endoscope shaft. Shown in FIG. 8 is a side view 820 and bottom view 830 depicting the relationship between an OCT shaft 804. WLC shaft 802 and OCT footprint 806, and their respective coordinate systems. Image 840 shows an appearance of an OCT endoscope in a WLC image indicating important features, including shaft lines $l_1$ and $l_2$ and regions $r_i$ in which the shaft lines split the plane. Although the shaft edges 808 are parallel in 3D space, the shaft lines intersect in the WLC image due to the perspective projection of the WLC. The example shown in FIG. 8 and described herein employs a WLC cystoscope as the primary endoscope and an OCT endoscope as the secondary endoscope, but other primary and secondary modalities are contemplated.

As seen in FIG. 8, the z-axis points from the distal to the proximal end of its cylindrical shaft 804. In certain embodiments of the invention, the WLC is modeled as a pinhole camera with intrinsic matrix $K \in \mathbb{R}^{3 \times 3}$, which captures its focal length and principal point (determined during calibration) and dictates the origin and orientation of the WLC coordinate system. The transformation matrix from the OCT to the WLC coordinate system $(T_{OCT \to WL} = [R\ t] \in \mathbb{R}^{3 \times 4})$ allows the OCT footprint to be represented as 2D points in the WLC image plane. Specifically, $$p_{WL} = K T_{OCT \to WL} P_{OCT}, \quad (2)$$

based on principles from projective geometry in which equality is understood as equal up an unknown scalar multiple. Although the OCT footprint is defined in 2D, $P_{OCT}$ is defined in 3D; the 2D footprint positions are all located in the plane z=0.

To describe the cylindrical appearance of the endoscope in the WLC images, it is noted that a cylinder is a quadric surface and that the image of a quadric in the image plane of a pinhole camera is a conic. Given the present coordinate convention, the (infinite) cylinder may be described with the point-quadric $$Q_{OCT} = \begin{bmatrix} 1 & 0 & 0 & 0 \\ 0 & 1 & 0 & 0 \\ 0 & 0 & 0 & 0 \\ 0 & 0 & 0 & -r_{scope}^2 \end{bmatrix},$$

with $r_{scope}$ defined as the radius of the cylinder. In the WLC coordinate system, the quadric is then given by $$Q_{WL} = T_{OCT \to WL}^T Q_{OCT} T_{OCT \to WL} = \begin{bmatrix} Q_{3 \times 3} & q \\ q^T & q_{4,4} \end{bmatrix}.$$

The projection of $Q_{WL}$ into the undistorted WLC image is a conic given by $C_{rend} = q_{4,4} Q_{3 \times 3} - qq^T$. In addition to this representation, the conic can also be measured from the given WLC image. Specifically, the conic is determined by the apparent contour of the endoscope, which is spanned by the two straight lines $l_1$ and $l_2$ (shaft lines) that outline the shaft edges 808, which represent the exterior of the OCT endoscope that runs parallel to the $z_{OCT}$-axis, as shown at 840. Algebraically, the conic in the undistorted WLC image is $C_{obj} = K^T (l_1 l_2^T + l_2 l_1^T) K$. Note that in the world coordinate system, the shaft lines are parallel and thus intersect at infinity. Hence, the projection of this intersection point into the WLC image is known as vanishing point 812. These two representations for the conic ($C_{obj}$ and $C_{rend}$) may be used to solve for the coordinate system transformation ($T_{OCT \to WL}$) for a single interest frame pair.

Detection of the Apparent Contours of the Secondary Endoscope

In many embodiments of the invention, this operation extracts the shaft lines that outline the contour of the endoscope. According to certain embodiments of the invention, applying Canny edge detection to $I_{B/R}$ produces a binary image, $I_{edge}$, where each pixel is labeled as an edge or not an edge based upon the strength of the gradient at that pixel and the presence of edges in surrounding pixels. Edges that lie outside of the binary endoscope mask $M_{scope}$, which represents an area that is slightly dilated compared with the true endoscope pose, are set to zero. This operation thus removes edges that are not associated with the endoscope shaft 804. Then, the shaft lines are identified using a Hough transform. Briefly, each edge pixel (a pixel for which $I_{edge}$ (i,j)=1) lies on a subset of all possible lines. The Hough transform determines lines on which a significant number of edge pixels lie via a voting scheme. Lines with a significant number of votes are selected as the putative shaft lines. If the Hough transform detects spurious lines (i.e., more than two), the two lines selected as shaft lines are those that intersect at a position that is closest to the intersection of the two lines found in the previous interest image ($v^{n-1}$): $\text{argmin}_{i,j} \| (l_i^n \times l_j^n) - v^{n-1} \|_2$. This makes sense because the endoscope pose remains nearly stationary between sequential interest images; hence, the position of the vanishing point 812 is roughly constant. If no intersection point has been previously determined, the two line segments that are farthest apart are chosen as the shaft lines. The shaft lines are denoted as $l_1$ and $l_2$, and the shape traced by these two lines is denoted the "apparent contour" of the OCT endoscope. Although specific edge and/or object detection techniques are disclosed above, as can readily be appreciated any of a variety of detectors and/or classifiers can be utilized to identify a secondary endoscope as appropriate to the requirements of given application in accordance with various embodiments of the invention.

Extraction of the Rotation Matrix and x- and y-Translations

According to several embodiments of the invention, to compute the rotation matrix R, the back projections of the two shaft lines are considered to be tangent planes to the endoscope whose contact points lie on two 3D lines that are parallel to the endoscope axis. Crucially, the intersection of the two shaft lines in the WLC image provides the vanishing point corresponding to the endoscope axis. Algebraically, the position of the vanishing point can be written as $v = l_1 \times l_2 = KRa$, where we choose $a = [0\ 0\ 1]^T$ to be the direction of the endoscope axis in the OCT coordinate system. Hence, given the vanishing point v and intrinsic matrix K, the rotation matrix can easily be recovered. We first determine the third column of the rotation matrix:

$$r_3 = \frac{K^{-1} v}{|K^{-1} v|}.$$

As the first two columns of the matrix must be orthogonal complements to the third, the complete rotation matrix can be determined (up to a rotation about the z-axis):

$$R = \frac{[(r_3)_\perp, r_3]}{|[(r_3)_\perp, r_3]|},$$

where $|A|$ denotes the determinant of a matrix, and $|A|_\perp$ denotes the orthogonal complement of a matrix (i.e., $A^T [A]_\perp = 0$ and $[A]_\perp^T [A]_\perp = I$). In several embodiments of the invention, the transformation matrix may be determined using all six degrees of freedom of a coordinate system transformation.

Next, according to some embodiments of the invention, the translation along the x- and y-axes between the two coordinate systems (i.e., $t_x$ and $t_y$, respectively) is determined. The two translation parameters are solved for by comparing the observed conic, $C_{obj}$, with the rendered conic, $C_{rend}$, given the coordinate system transformation $T_{OCT \to WL}$ in the WLC image plane. Here it is set $t_z = 0$ (i.e., $t = [t_x\ t_y\ 0]$), which yields two translation parameters without loss of generality (the translation along the endoscope axis may be determined later using the detected tip 810 of the endoscope). Note that when the translation values for $t_x$ and $t_y$ are correct, the rendered and observed conics should be equal up to a scale factor: $P(t_x, t_y, s) = C_{rend} - s C_{obj} = 0$. Thus, this is a polynomial system of equations parametrized by $s$, $t_x$, and $t_y$; after some algebraic manipulation it can be rewritten as a $M [t_x^2\ t_x t_y\ t_y^2\ s\ 1]^T = 0_{6 \times 1}$. A solution for $s$, $t_x$, and $t_y$ can be extracted from the unique null vector of the known system matrix M. In actuality, four solutions for the pair $(t_x, t_y)$ (two values for each variable) can be extracted. When the OCT endoscope is in front of the cystoscope, each of the four solutions corresponds to the appearance of the OCT endoscope in one of the four regions of the WLC imaging plane defined by the shaft lines as seen in image 840 of FIG. 8. The final $(t_x, t_y)$ values are selected by finding the pair that projects the endoscope into the same quadrant in which the observed endoscope lies using $M_{scope}$.

Extraction of the Endoscope Tip and the z-Axis Translation

According to many embodiments of the invention, the translation along the z-axis between the OCT and WLC coordinate systems is determined. The general strategy is to find the z-axis translation (consistent with the computed R, $t_x$, and $t_y$) that best captures the appearance of the endoscope in the WLC image. An analysis-by-synthesis approach may be followed that may include two operations: (synthesis) rendering the appearance of the OCT endoscope in the WLC image given an assumed z-axis translation and (analysis) comparing the rendered image appearance with the original WLC image. Using the coordinate system transformation ($T_{OCT \to WL}$), a binary image is rendered of the endoscope $I_z$, where only pixels that correspond to locations on the endoscope are set to one.

The rendered image may be compared to $I_{B/R}$ at a region near the rendered endoscope tip using the metric $$f(z) = \frac{1}{N} \sum_{(x,y)} [I_z(x, y) - I_{B/R}(x, y)],$$

where N is the number of pixels in the evaluation region. In some embodiments of the invention, only pixels near the tip are evaluated, because the position of the tip may be most critical and there may be pixels outside of this region that bias the comparison. The "correct" z-axis position (i.e., where f(z) is minimized) should occur where the two images, $I_z$ and $I_{B/R}$ are best matched, because both images have pixels equal or close to one on the endoscope and lower values outside the endoscope. This analysis-by-synthesis is fairly efficient since it reduces the problem to a 1D search problem along the z-axis.

Although methods of footprint detection are described above with respect to FIG. 8, any of a variety of methods for detecting footprints of a secondary endoscope within primary-endoscopy data as appropriate to the requirements of a specific application can be utilized in accordance with embodiments of the invention. Additionally, in some embodiments of the invention, the footprint detection method may determine the transformation matrix between primary and secondary endoscopes, where the secondary endoscope is non-cylindrical. This may include an endoscope that is cylindrical but has different radii along its length or an endoscope that is not rotationally symmetric. According to certain embodiments of the invention, an image processing technique may be utilized to determine the amount of in-plane rotation between adjacent-secondary images, and/or rotation about the cylindrical axis between primary and secondary coordinate systems, to determine the complete rigid transformation (i.e., 3 degrees of freedom of translation and 3 degrees of freedom of rotation) between the two coordinate systems. This parameter could be measured by using correlation between volumes, or using markings on the tip of the secondary endoscope. This technique may employ the general rule that in-plane rotation does not change significantly between adjacent frames. In several embodiments of the invention, a combination of primary and secondary data may be utilized to detect and account for tissue deformation (reach). Methods for footprint projection in accordance with a number of embodiments of the invention are discussed further below.

Footprint Projection

According to various embodiments of the invention, to determine (740) the 3D positions 742 of the OCT footprints 732, points contained within a 2D OCT footprint are projected onto the 3D mesh 714 by casting a ray from each 2D point through the camera center of the given WLC image, whose pose with respect to the 3D mesh was determined in the 3D reconstruction method. The intersections of these rays with the 3D mesh provide the OCT footprint 742 in 3D.

To handle the case where there is no calculated WLC pose associated with an interest image, the OCT footprint is registered to the 3D mesh by chaining together two transformations, $T_{WL(i) \to RI} T_{OCT(i) \to WL(i)}$:

$$p_{RI} = KT_{WL(i) \to RI(i)} T_{OCT(i) \to WL(i)} p_{OCT}. \quad (3)$$

The transformation $T_{WL(i) \to RI}$ is computed by registering the interest image to a nearby image (a "registration image," RI), whose WLC pose is known. Each interest image is initially registered to the RI by matching SIFT features between the two and determining an affine transformation $T_{WL(i) \to RI(i)}$ that describes their relationship. If an insufficient number of feature matches are found, the OCT footprint is not registered to the mesh.

Using the 3D footprints, a second mesh (OCT overlay mesh) may be created containing the areas imaged with OCT. The OCT footprint can either be displayed in a solid color or by using the OCT enface images as the texture. Using the original mesh and OCT overlay mesh, the regions imaged with OCT can be visualized relative to the bladder anatomy and compared with the appearance of the bladder under WLC.

Although methods of footprint projection are described above with respect to FIG. 7A, any of a variety of methods for determining the 3D positions of footprints as appropriate to the requirements of a specific application can be utilized in accordance with embodiments of the invention. A flow chart for the method of registering secondary data to a 3D reconstruction based on primary data according to some embodiments of the invention is described below.

Secondary-Data Registration Process

Figure 7B:
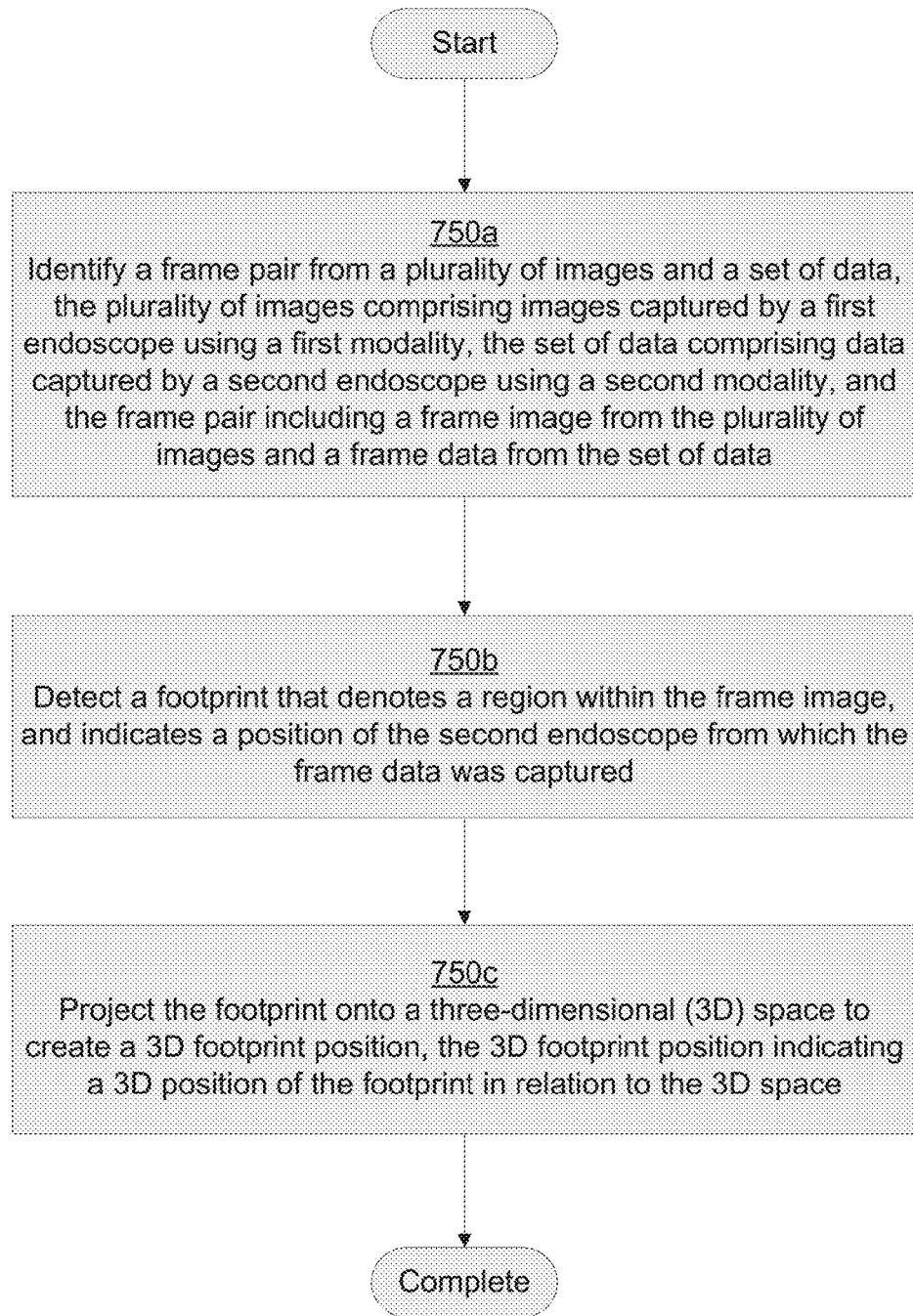
FIG. 7B is a flow chart illustrating a method for processing a plurality of images captured by a first endoscope and a set of data captured by a second endoscope in accordance with an embodiment of the invention.

A secondary data registration method 750 for processing a plurality of images captured by a first endoscope and a set of data captured by a second endoscope, according to many embodiments of the invention, is shown in FIG. 7B.

In a number of embodiments of the invention, a frame pair is identified (750*a*) from a plurality of images and a set of data. The plurality of images may include images captured by a first endoscope, such as a mother endoscope, using a first modality. The set of data may include data captured by a second endoscope, such as a daughter endoscope, using a second modality. The second modality may be different than the first modality, and may optionally include optical coherence tomography (OCT). The set of data may include one or more volumes, 2D or 1D images, and/or individual measurements. The frame pair may include a frame image from the plurality of images and a frame data from the set of data. In some embodiments of the invention, the frame image and the frame data may contain simultaneously-acquired data, data from corresponding frames of endoscopic data capture, and/or overlapping data. In certain embodiments of the invention, the method 750 may further include defining an interest frame pair including an interest image from the plurality of images and an interest data from the set of data, wherein the interest image and the interest data contain data meeting at least one criterion. This criterion may include requiring that the second endoscope be visible in the interest image, and/or that the interest data contain data with a high signal-to-noise ratio (SNR).

In some embodiments of the invention, a footprint is detected (750*b*), where the footprint denotes a region within the frame image and indicates a position of the second endoscope from which the frame data was captured. In certain embodiments of the invention, the footprint is detected by determining a transformation between a first coordinate system of the first endoscope and a second coordinate system of the second endoscope. According to certain embodiments of the invention, the footprint may denote a region within an interest image, and/or indicate a position of the second endoscope from which an interest data was captured.

The footprint may, according to several embodiments of the invention, be projected (750*c*) onto a three-dimensional (3D) space to create a 3D footprint position, where the 3D footprint position indicates a 3D position of the footprint in relation to the 3D space. The 3D space may comprise any of a variety of three-dimensional areas or projections. According to certain embodiments of the invention, the 3D space may comprise a 3D reconstruction of an organ. The 3D reconstruction may be generated based on the plurality of images, and may be generated using a method such as but not limited to a 3D reconstruction in accordance with several embodiments of the invention, as described above in relation to FIGS. 1A-1C above. The method 750 may include generating the 3D reconstruction, or it may include receiving the 3D reconstruction from another source.

In some embodiments of the invention, method 750 further includes creating an overlay estimation using the 3D footprint position, where the overlay estimation corresponds to one or more regions of the organ indicated within the set of data.

Although methods of secondary data registration are described above with respect to FIGS. 7A-7B, any of a variety of methods for registering secondary-endoscopy data to a 3D model of an organ based on primary-endoscopy data, as appropriate to the requirements of a specific application, can be utilized in accordance with embodiments of the invention. Below, clinical methodology for implementing the above-described methods in accordance with a number of embodiments of the invention are discussed further below.

Methodology

Researchers demonstrated the secondary-endoscopy data registration technique with cystoscopy data from the bladder. Early detection of bladder cancer is of significant importance given its high recurrence rate of 50-90% and the high cost burden of bladder cancer surveillance on the health care system. Bladder cancer patients undergo an office-based white light cystoscopy (WLC) at least once a year, but the limited specificity of WLC and its inability to stage tumors can require unnecessary and costly surgeries. Optical coherence tomography (OCT) is a promising complement to WLC due to its ability to image in depth, which allows it to distinguish cancerous from healthy tissue (i.e., based on the number of subsurface layers). While OCT has successfully been used to classify cancerous tissue, the existing workflow only permits on-the-fly tissue classification, as the two imaging modalities are not registered temporally or spatially. OCT data that are co-registered to a 3D reconstruction of the bladder wall may enable complete staging of a tumor or identification of surgical margins, a visualization that could help a surgeon prepare for surgery or track tumor recurrence.

System Setup

Figure 9:
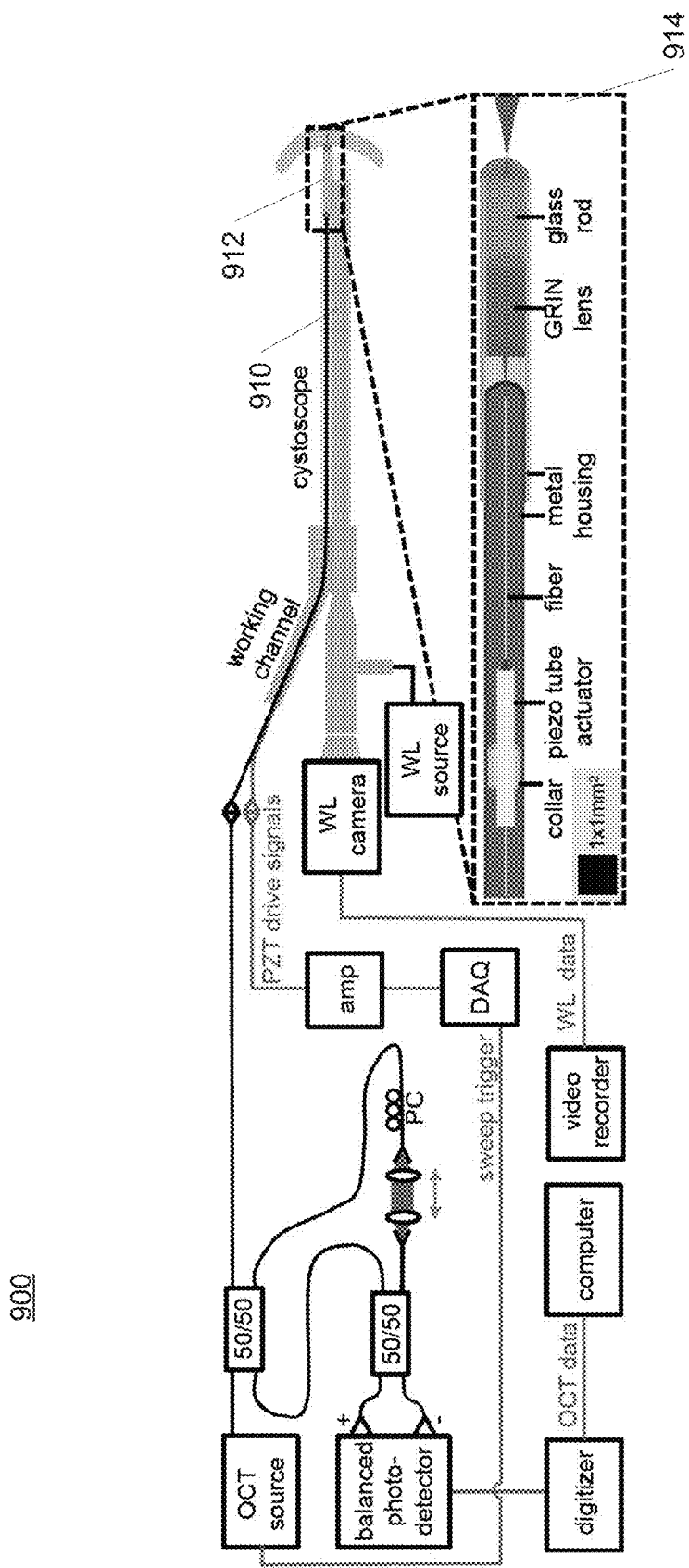
FIG. 9 is a conceptual illustration of a system setup with a primary endoscope and secondary endoscope in accordance with an embodiment of the invention.

The data acquisition system consisted of a commercial WLC unit and a custom-built OCT endoscope and engine. FIG. 9 shows the WLC and OCT system setup 900 with optical and electronic system design. The inset 914 shows a cross-section of the distal end 912 of the OCT endoscope 910. The following abbreviations are used: DAQ for data acquisition device, GRIN for graded index lens, PC for polarization controller, and PZT for piezo-electric transducer.

The commercial WLC unit included a rigid cystoscope, light source, camera, and video recorder (Stryker, 1488HD). The custom-built OCT engine included a modified and miniaturized lens assembly for the OCT endoscope. The lens assembly consisted of a 1-mm OD GRIN lens (GoFoton, _W10=SLW10) and 1-mm OD glass rod, which facilitated reducing the diameter and rigid length of the OCT endoscope scope from 3.0 mm and 25 mm, respectively, to 1.3 mm and 19 mm, compared to the previous iteration. These design modifications enable the OCT endoscope to fit into a wide range of working cystoscope channels, including those of some flexible cystoscopes. The OCT system had a sensitivity of 94 dB with an axial resolution of 9.6 µm, lateral resolution of 10 µm, and a field of view of 700 µm. The WLC images had a resolution of 720×1280 pixels and a frame rate of 30 Hz.

Researchers calibrated the OCT scan pattern and WLC to map the lateral position for each A-scan, eliminate distortions and determine the intrinsic camera parameters. Each OCT volume was associated with a given WLC image (i.e., creation of frame pairs) based upon the known OCT and WLC frame rates and a time offset determined by imaging a series of horizontal black (high absorption under OCT) and white (low absorption under OCT) lines translated underneath the OCT-WLC and maximizing the correlation between intensity data within the field of view of the OCT endoscope obtained from both systems.

Samples

The technique was validated using in vivo samples collected during intraoperative cystoscopy and an optical phantom. In vivo data were collected during an intraoperative cystoscopy in patients scheduled to undergo bladder biopsy or tumor resection. Data were collected from consenting patients undergoing endoscopic procedures in the operating room as part of their standard of care. This protocol was approved by the Stanford Institutional Review Board and the Veterans Affairs Palo Alto Health Care System. For a proof-of-concept validation, a mock probe (a 2-mm, blue ureteral catheter (Cook Medical)) was inserted into the working channel of a standard 21-Fr rigid cystoscope to mimic the placement of the OCT endoscope in images, as OCT data were not collected in vivo.

Phantom data were collected in a laboratory setting with the combined OCT and WLC systems. The phantom consisted of a 3D-printed, three-inch inner-diameter semi-cylinder with a length of four inches onto which a high-resolution bladder image was color-printed and affixed to the interior. The high-resolution bladder image was constructed from the texture of a reconstructed human bladder. Small dark shaded circles were added to the bladder image to provide a marker that was clearly distinguishable in both WLC and OCT data: the shaded circles are clearly visible in the WLC images, and the increased absorption of the shaded regions in the spectrum of the OCT light source compared with the rest of the image provided a simple confirmation of imaging with the OCT endoscope. To match the appearance of the probe between in vivo and phantom imaging conditions, a small segment of the blue catheter was placed over the housing of the OCT endoscope during phantom imaging.

Evaluation and results based on the above methodology are discussed below.

Evaluation and Results

Evaluation of OCT Footprint Detection

Figure 10:
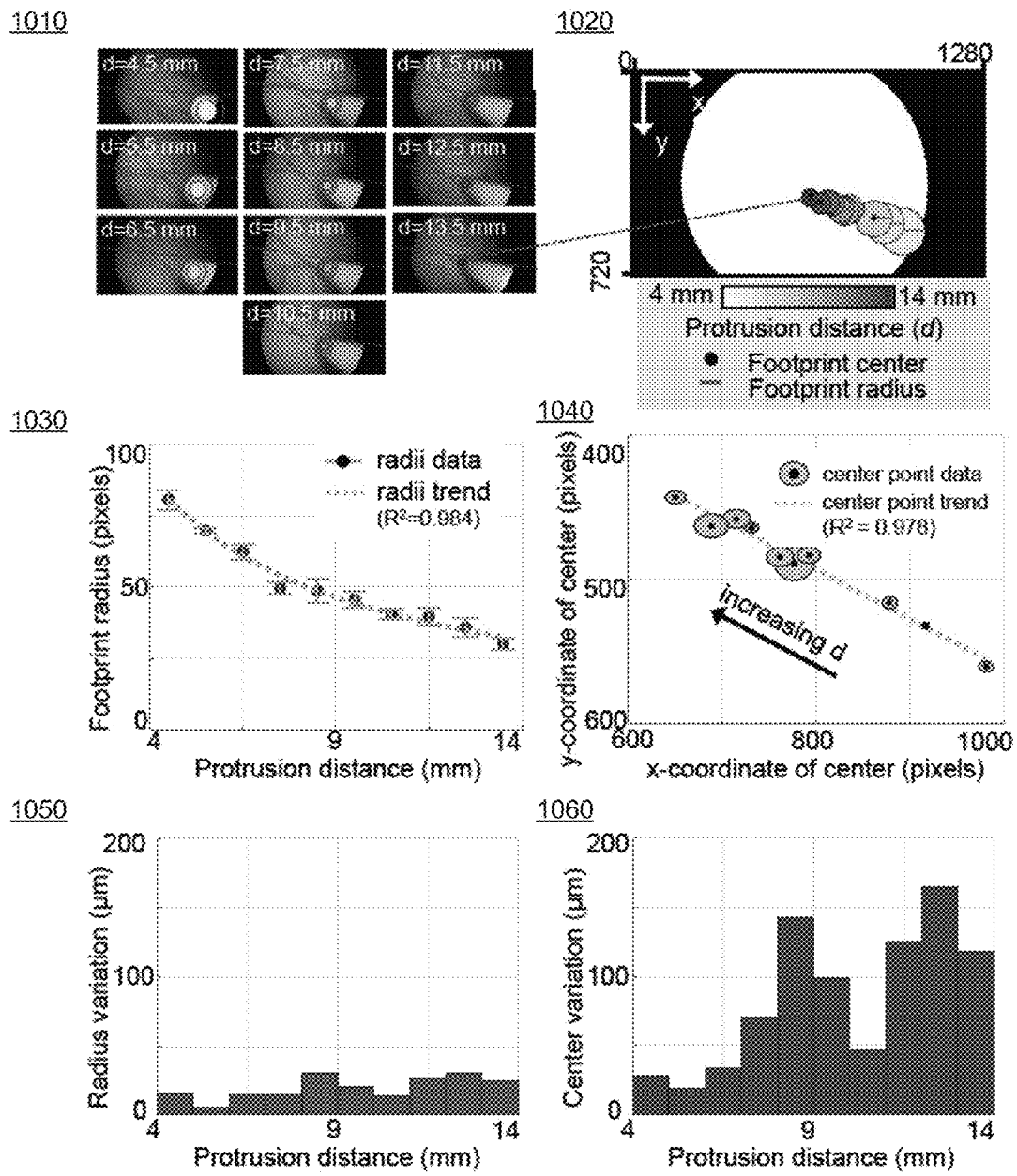
FIG. 10 is a diagram showing results of an implementation of a secondary-endoscopy data registration method in accordance with an embodiment of the invention.

The footprint detection method was evaluated using the phantom. FIG. 10 shows radii and center points of an OCT endoscope as a function of the distance the OCT endoscope protrudes from the end of the WLC ("protrusion distance," d). Images 1010 show representative WLC images with shaft lines and OCT footprints. Images 1020 show an overlay of footprints on WLC image mask. Trends and data for footprint radius and center position in pixels are shown in graphs 1030 and 1040, respectively. Error bars and ellipses show ±1σ from mean. Graphs 1050 and 1060 show standard deviation for footprint radius and center position, respectively, in µm as functions.

The OCT endoscope was deployed from the working channel of the WLC cystoscope and was protruded to various distances (i.e., 4.5 mm-13.5 mm in increments of 1 mm in the $z_{OCT}$ direction). At each distance, the phantom was translated underneath the cystoscope so that different regions of the phantom were imaged while the OCT endoscope remained stationary relative to the WLC. Three hundred images were collected for each distance; the relative transformation between the WLC and OCT coordinate systems was computed and the OCT footprint was determined according to Eq. 2, as shown in FIG. 10 at images 1010 and 1020. Using these data, the detected OCT footprint was assessed (1) by comparing the measurements of the footprint radius and center position with expected values based on a projective camera model and (2) by comparing the variation in the measurement when the OCT endoscope was kept fixed relative to the WLC.

Assuming the OCT endoscope is protruded in a consistent direction for all distances, the radius should be inversely proportional to the distance between the tip of the OCT endoscope and the center of the WLC camera: that is, $r=\alpha(d+d_0)^{-1}$, where r is the radius in pixels, $\alpha$ is a proportionality constant in units of pixels per mm, d is the protrusion distance and $d_0$ is the distance between the WLC tip and the camera center. The measured average radii for each protrusion distance were fit with this equation by solving for $\alpha$ and $d_0$. The measured data fit the expected radii trend well ($R^2=0.984$): as the OCT endoscope protrudes further from the WLC, the radius of the footprint decreases in size, as shown in graph 1030 in FIG. 10. The trajectory of the center point of the OCT footprint was similarly assessed as the OCT endoscope was protruded from the working channel, as shown in graph 1040. From the projective camera equation (Eq. 3), it can be shown that the change in x and y coordinates of the center position during protrusion should have a linear relationship, provided the direction of the protrusions is consistent. The measured center points were fit with a line ($R^2=0.978$) to highlight the linear relationship between the measured data. Some of the points tend to oscillate about this line, which we believe is partially due to the experimental setup: the protrusion of the OCT endoscope exceeded its rigid length and, as the diameter of the OCT endoscope was much smaller than the working channel, the protrusion direction varied slightly for different protrusion distances.

In addition to comparing the measured data with the expected trend, researchers also evaluated the precision of the measurements. Precision was evaluated by computing the standard deviation of a footprint parameter (e.g., radius) for a given protrusion distance. Because the sample was translated underneath the endoscope during the measurement, these results also attest to the robustness of the measurement to noise and imaging conditions. The precision is shown as error bars as a function of pixels in graphs 1030 and 1040 and as a function of μm in graphs 1050 and 1060. The standard deviation for the radius was 19.92±8.18 μm (2.64±0.92 pixels). For the 2D center points, the standard deviation representing motion around the average center point for each protrusion distance was 84.87±51.96 μm (10.60±5.30 pixels). The values were converted from pixels (graphs 1030 and 1040) to μm (graphs 1050 and 1060) using the known OCT volume radius in μm (350 μm) and the measured radius in pixels as a conversion factor.

In general, larger protrusion distances lead to larger errors. This result is consistent with the observation that for larger protrusion distances, the number of pixels that represent the diameter of the OCT footprint is much smaller (78 pixels for d=4.5 mm vs. 30 pixels for d=13.5 mm). However, for all measurements the precision is below 200 μm—well below the precision required for the identification and standard endoscopic resection of mucosal tumors—which suggests that the method works well for this application.

The qualitative evaluation of the registration method is discussed below.

Qualitative Evaluation of OCT Registration

Figure 11:
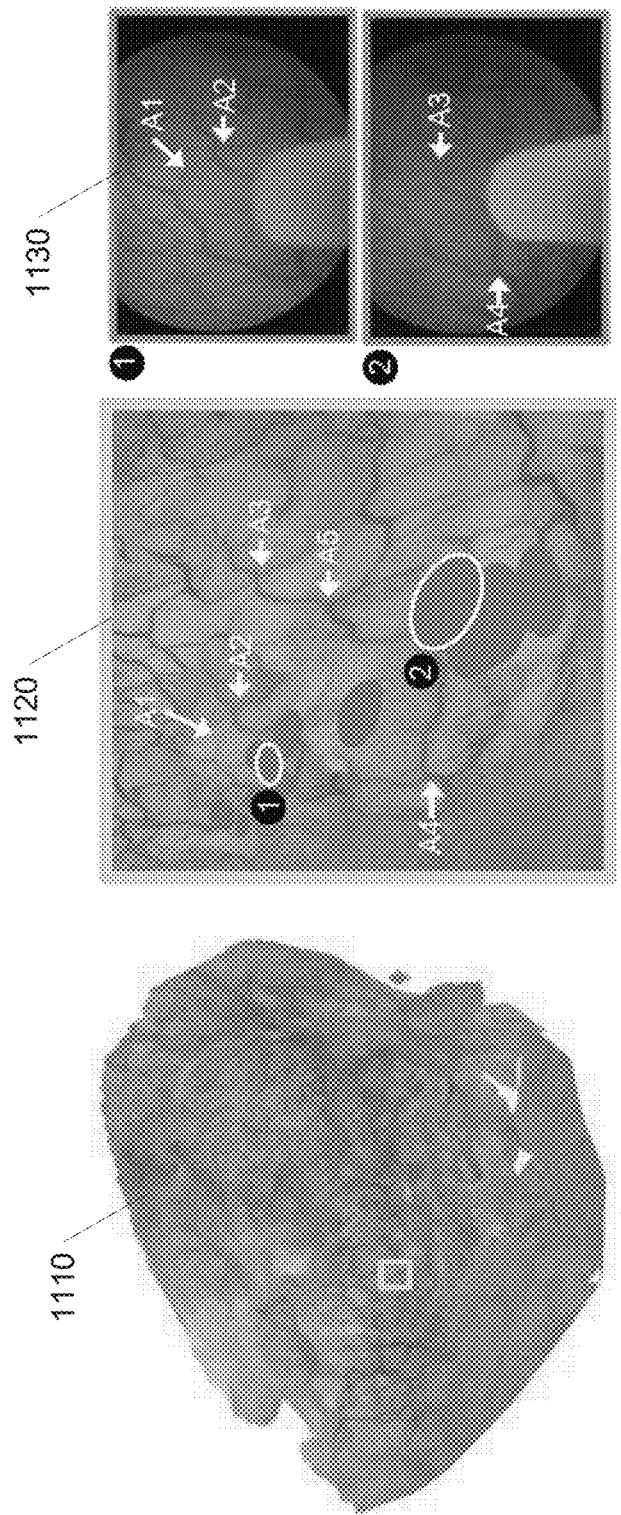
FIG. 11 is a diagram showing additional results of an implementation of a secondary-endoscopy data registration method in accordance with an embodiment of the invention.

Using both in vivo and phantom samples, researchers demonstrated the complete registration process. FIG. 11 shows an example reconstruction and registration for in vivo bladder data, including: full reconstruction 1110 with registered OCT volumes; zoomed-in region 1120 of the box shown at 1110; and original WLC images 1130 that correspond to two interest frame pairs. Color differences between reconstruction and original images are due to image preprocessing that reduces lighting gradients. The box at reconstruction 1110 and outlining region 1120 represents an area of approximately 1 cm$^2$. Arrows indicate similarities between reconstructed texture and original images.

In vivo, researchers recorded data for 6:40 min with 368 interest frame pairs, which required 167:33 min of processing time with unoptimized code. Due to existing restrictions on the use of the OCT endoscope in humans, only WLC data were recorded in vivo, and a standard blue catheter served as the daughter endoscope (i.e., a "dummy OCT endoscope) to mimic the procedure of collecting OCT data. Although the appearance of the dummy endoscope was detected in the WLC images, there was no actual OCT data collected, which prevented us from using the high-SNR of OCT images as a criterion to identify interest frame pairs. Instead, every fourth frame was selected for which the OCT endoscope was visible in the WLC image as an interest frame pair. FIG. 11 shows a complete reconstruction 1110 of the human bladder sample overlaid with positions where the "dummy" OCT volumes were collected. Due to a limited number of features seen when the WLC is brought close to the bladder wall, only 24% of the OCT footprints of the interest frame pairs could be registered to the 3D reconstruction. Use of improved tracking of the WLC pose in the 3D model generation process (e.g., through a simultaneous localization and maximization (SLAM) operation) may help to recover a larger fraction of OCT footprint positions. For the footprints that could be registered, the similar vasculature pattern surrounding the registered dummy volumes and the original WLC images indicate that the volumes are registered in the correct position. However, the position of the OCT footprint is slightly misaligned and varies in size. For example, the bifurcation seen with arrow 5 (A5) in region 1120 is not visible in images 1130. This discrepancy is due to the fact that there was no noticeable contact made between OCT endoscope and urothelium during this preliminary in vivo testing, and due to the lack of actual OCT data we had no way to ensure contact between the OCT endoscope and bladder wall. Nonetheless, the locations of OCT footprints in the 3D reconstruction appear consistent with the original corresponding WLC images.

Figure 12:
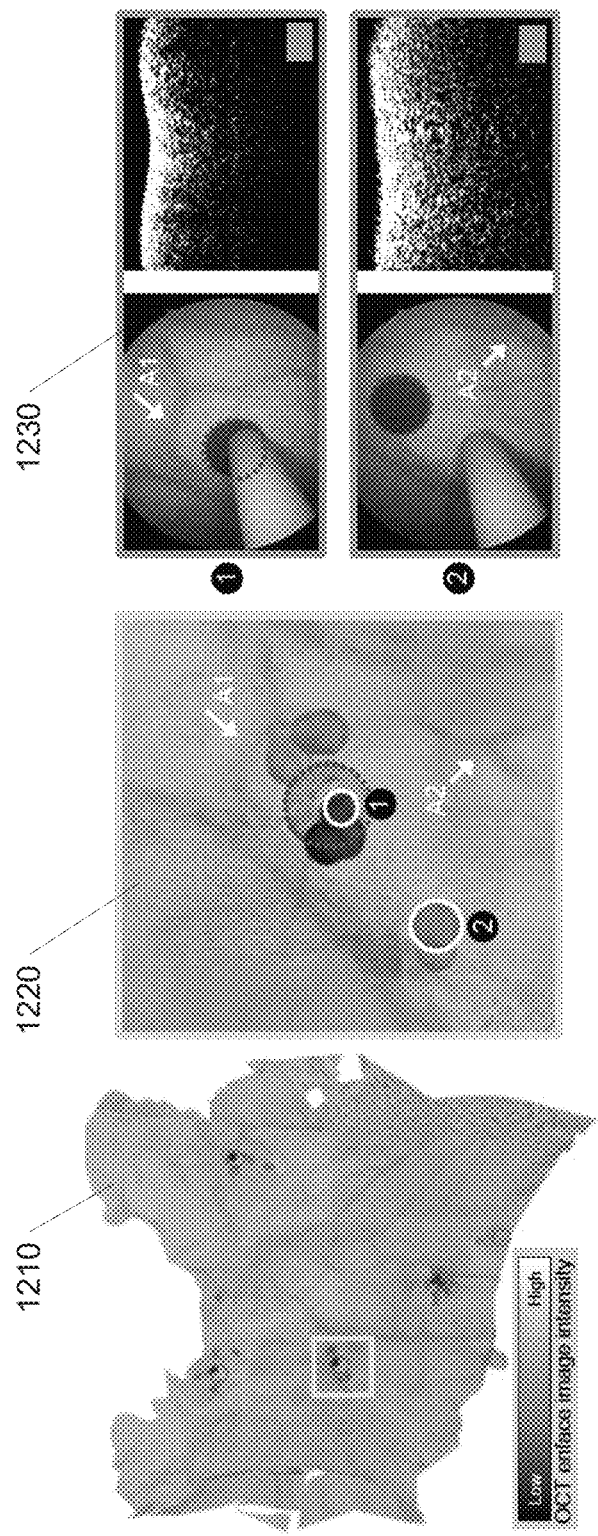
FIG. 12 is a diagram showing yet additional results of an implementation of a secondary-endoscopy data registration method in accordance with an embodiment of the invention.

To further validate the method, researchers imaged a tissue-mimicking phantom data for which it could be certain that the OCT endoscope was in contact with the sample. FIG. 12 shows an example reconstruction and registration for the phantom bladder, including: full reconstruction 1210 overlaid with registered OCT volumes shown as the enface projections, zoomed in region 1220 of complete reconstruction, and example interest frame pairs 1230 from a tissue region [1] and a shaded circle region [2]. The color differences between reconstruction and original images are due to an image preprocessing method. To emphasize the shaded circles, they are outlined using a dotted line. The box in reconstruction 1210 and outlining region 1220 represents an area of 6.6×6.1 mm$^2$. The boxes in interest frame pairs 1230 represent an area of 100 μm$^2$. Arrows indicate similar features between reconstructed texture and original WLC images.

Both WLC and OCT data were collected for a total video length of 3:37 min comprising 437 interest frame pairs. The data were processed according to an embodiment of the registration method described above, and the computations required 96:38 min with unoptimized code. FIG. 12 shows the 3D reconstruction 1210 with the en face OCT images overlaid with a false colormap. The example interest frame pairs show that when the OCT endoscope images a shaded circle (#1), there is increased loss of signal at shallow depths compared with when the endoscope images a non-shaded circle (#2) (interest frame pairs 1230). This observation affects the en face images that are projected onto the 3D reconstruction: the appearance of the en face image is notably darker when the OCT image is registered to a region within the shaded circles (indicated by dashed lines). The comparison was extended by classifying both the OCT image and the corresponding registered WL region as imaging or not imaging a shaded circle. The OCT image was classified as viewing a shaded circle if the average en face intensity was greater than a threshold of 100 and classified the registered WL region as imaging a shaded circle if the center of the enface image corresponded with a shaded pixel in the circle. The classification between WL and OCT data was 93.6% accurate, and the only misalignment came from a region where the texture was poorly reconstructed. These error were likely due to inaccuracies of the camera pose, and could be improved from an additional operation that refines the camera poses. This agreement between the 3D reconstruction and the OCT data suggests that the OCT volumes are registered accurately to the 3D reconstruction. Additionally, this method of validation enables a direct comparison between the registration of the two imaging modalities and does not require a separate positioning system for validation.

Although the above examples use particular systems and equipment, the co-registration method according to various embodiments of the invention can be applied to other daughter endoscopes that operate in a contact mode or for which distance from tissue is either known or unknown. These alternative daughter endoscopes may include spectroscopy, fluorescence microscopy (e.g., confocal). In addition, the secondary endoscope may provide one or more of various types of data, including but not limited to volumes, 2D images, 1D images, or individual measurements. In other embodiments of the invention, the method may not register the secondary data to a complete 3D reconstruction, but instead registers it to a local panorama or smaller 3D reconstruction of the organ wall. In addition, co-registrations from different sessions may be used as landmarks to assist with longitudinal registration of panoramas across timepoints, and can be used to produce or facilitate panorama-like reconstructions of secondary endoscopy data. According to certain embodiments of the invention, 3D information from secondary-endoscopy data may be used to locally correct for shape of the primary endoscope reconstruction. The method may optionally be extended to non-contact endoscopes utilizing the depth information from 3D reconstruction known size of the daughter endoscope to gauge distance from organ wall.

CONCLUSION

A method according to embodiments of the invention is demonstrated for generating high-quality 3D reconstructions of the bladder wall and co-registering multiple reconstructions from the bladder of a single patient. The proposed method pipeline and image acquisition protocol support the use of standard clinical equipment and require only minor modifications to the standard imaging workflow. Hence, the pipeline can successfully reconstruct real clinical data obtained from in vivo environments.

In many embodiments, systems and methods in accordance with various embodiments of the invention can also serve as the foundation for surgical planning, quality assessment of the procedure, optical annotation, and integration with other optical technologies (e.g., confocal microscopy, optical coherence tomography). A longitudinal record of the bladder appearance can enable new quantitative studies of the time-varying appearance in the bladder wall: for example to predict the location of early tumors or to stratify patient outcomes. The reconstructions presented in this work are based on rigid cystoscopies, but the proposed method is extendable to flexible cystoscopes, which are able to achieve full coverage of the bladder (e.g., bladder neck). Importantly, the shape-agnostic nature of the method may make it extendable to reconstructions of other organs using their respective endoscopy derivatives.

In addition, a registration method was developed that enables localization of volumetric OCT data to a 3D reconstruction of the bladder obtained with a standard cystoscope and a miniature daughter endoscope. The method detects the arbitrary pose (position and orientation) of a OCT daughter endoscope and then using this information to register the OCT volume to a 3D bladder reconstruction. In this regard, this method outlines a general strategy for co-registration of mother-daughter endoscopes of different secondary modalities.

Systems and methods in accordance with many embodiments of the invention can provide a powerful post-procedural review tool in applications where white light endoscopy is complemented with a secondary imaging modality (e.g., confocal laser endoscopy where daughter-endoscopes are already available for clinical use). In the case of OCT-WLC for bladder cancer, this technique could be useful for reviewing patient history prior to cystoscopic surveillance examinations, surgical planning, or longitudinal tracking of suspicious lesions to improve early detection rates.

As a specific application example, a 3D reconstruction generated via methods according to many embodiments of the invention may be utilized as a visual medical record to facilitate surveillance of suspicious mucosal lesions and/or sites of prior cancer recurrences. The 3D reconstruction may provide a broader, panoramic inspection of the mucosa surrounding the suspected lesion, including changes in vascular pattern over time.

In some embodiments of the invention, the 3D reconstruction may be used to perform bladder mapping of the other structures immediately outside of the bladder, and in particular, to reduce the risk of bladder perforation during transurethral resection of bladder tumor. The obturator nerves are located just outside of the lateral walls of the bladder. During electrosurgical resection, the electrical energy may stimulate the obturator nerve, thereby triggering a sudden adduction of the hip and thigh, which can result in inadvertent perforation of the bladder wall. A potential application of the certain embodiments of the invention would be to use a mother-daughter endoscopy setup in which the daughter probe is a low voltage blunt-tip electrode to interrogate the lateral wall of the bladder and optically map the nerve distribution. If such knowledge is known preoperatively, it may enable the surgeon to better plan for surgical and anesthetic strategy.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for processing a plurality of images captured by an endoscope, comprising:
    preprocessing a plurality of images, the plurality of images comprising images captured by an endoscope, wherein the plurality of images includes images of at least a portion of an organ and the preprocessing includes:
        estimating variations in light intensity within scenes captured by the plurality of images;
        computing at least one mask based on the variations in light intensity and at least one criterion; and
        generating a set of color-adjusted images based on the variations in light intensity, wherein generating the set of color-adjusted images comprises applying the at least one mask to the plurality of images;
    generating a three-dimensional (3D) point cloud representing points on a surface of the organ based on the set of color-adjusted images;
    defining a mesh representing the surface of the organ based on the 3D point cloud; and
    generating a texture of the surface of the organ based on the set of color-adjusted images.

2. The method of claim 1, wherein the variations are associated with a distance between a light source and a portion of the surface of the organ.

3. The method of claim 1, wherein the at least one mask includes a first mask and a second mask, and the set of color-adjusted images includes structure reconstruction images generated by applying the first mask and texture reconstruction images generated by applying the second mask.

4. The method of claim 3, wherein generating the 3 D point cloud further comprises generating the 3 D point cloud based on the structure reconstruction images.

5. The method of claim 3, wherein generating the texture further comprises generating the texture based on the texture reconstruction images.

6. The method of claim 1, wherein the at least one criterion includes a first criterion and a second criterion, the second criterion being more restrictive than the first criterion.

7. The method of claim 6, wherein the second criterion is defined to eliminate regions of high noise.

8. The method of claim 1, wherein the mesh comprises a triangle mesh including a set of vertices and a set of faces.

9. The method of claim 1, wherein the texture comprises an image and a set of mappings between pixels of the image and vertices of the mesh.

10. The method of claim 1, further comprising:
    generating camera poses associated with the plurality of images, the camera poses including position information and orientation information; and
    wherein generating the texture is further based on the camera poses.

11. A computing device comprising:
    a processor; and
    a memory connected to the processor and configured to store an image processing program, wherein the image processing program configures the processor to:
        preprocess a plurality of images, the plurality of images comprising images captured by an endoscope, wherein the plurality of images includes images of at least a portion of an organ and the preprocessing includes:
            estimating variations in light intensity within scenes captured by the plurality of images;
            computing at least one mask based on the variations in light intensity and at least one criterion; and
            generating a set of color-adjusted images based on the variations in light intensity, wherein generating the set of color-adjusted images comprises applying the at least one mask to the plurality of images;
        generate a three-dimensional (3D) point cloud representing points on a surface of the organ based on the set of color-adjusted images;
        define a mesh representing the surface of the organ based on the 3D point cloud; and
        generate a texture of the surface of the organ based on the set of color-adjusted images.

* * * * *